(12) United States Patent
Ling et al.

(10) Patent No.: US 7,167,616 B2
(45) Date of Patent: Jan. 23, 2007

(54) GRATING-BASED WAVELENGTH SELECTIVE SWITCH

(75) Inventors: Peiching Ling, San Jose, CA (US); Wayne Lui, Fremont, CA (US); Jinliang Chen, Saratoga, CA (US); Jianjun Zhang, Cupertino, CA (US); Ming Xu, San Jose, CA (US); Yu Chen, Hamilton (CA)

(73) Assignee: Integrated Optics Communications Corp., Sunnyvale, CA (US)

( * ) Notice: Subject to any disclaimer, the term of this patent is extended or adjusted under 35 U.S.C. 154(b) by 0 days.

(21) Appl. No.: 10/923,369

(22) Filed: Aug. 20, 2004

(65) Prior Publication Data

US 2006/0039647 A1 Feb. 23, 2006

(51) Int. Cl.
*G02B 6/34* (2006.01)

(52) U.S. Cl. .......................................... 385/37
(58) Field of Classification Search .................. 385/37
See application file for complete search history.

(56) References Cited

U.S. PATENT DOCUMENTS 7,003,181 B1* 2/2006 Domash et al. ............... 385/10
2004/0146240 A1* 7/2004 Zhang et al. ................. 385/24
2004/0228574 A1* 11/2004 Chen et al. ................... 385/27

\* cited by examiner

*Primary Examiner*—Sung Pak
*Assistant Examiner*—Tina M Wong
(74) *Attorney, Agent, or Firm*—Bo-In Lin

(57) ABSTRACT

The present invention is a wavelength-selective optical transmission system that includes a first waveguide for transmitting a multiplexed optical signal therethrough. The system further includes a second waveguide coupled to the first waveguide wherein a least one of the first and second waveguides have a set of wavelength-selective Bragg gratings disposed near a coupling section between the first and second waveguides to reflect a reflecting optical signal back to the first waveguide and for transmitting a contra-directional optical signal and a co-directional optical signal having respectively a contra-directional selected wavelength and a co-directional selected wavelength corresponding to the Bragg gratings. One of the contra-directional and co-directional wavelengths is chosen as a designated wavelength, and the reflecting optical signal and one of the contra-directional or co-directional optical signals are outside of a predefined range surrounding the designated wavelength.

17 Claims, 16 Drawing Sheets

GRATING-BASED WAVELENGTH SELECTIVE SWITCH

This application claims priority to pending U.S. patent application entitled "IMPROVED GRATING-BASED WAVELENGTH SELECTIVE SWITCH" filed Dec. 9, 2003 by Ling et al. and accorded Ser. No. 10/731,297 the benefit of its filing date being hereby claimed under Title 35 of the United States Code.

BACKGROUND OF THE INVENTION

1. Field of the Invention

This invention relates generally to technologies for switching and routing optical wavelengths. More particularly, this invention relates to innovative method, structures and processes to manufacture and design improved waveguide grating-based wavelength selective switches.

2. Description of the Related Art

Current state of the art in wavelength-selective optical switching based signal transmission systems are still limited by several performance deficiencies caused by crosstalk, low coupling efficiency, and large size and poor form factors.

Because of the extremely wide transmission bandwidth allowed by optical fibers, all-optical fiber networks are increasingly being used as backbones for global communication systems. To fully exploit the fiber bandwidth in such networks, wavelength-division multiplexing (WDM) and wavelength-division demultiplexing (WDD) technologies are employed so that several independent optical signal streams may share the same fiber simultaneously, wherein the streams are distinguished by their center wavelengths. In the past, the adding, dropping, and cross connecting of individual optical signal in communication systems are done by first converting the optical signal into electrical signals. The electrical signals are manipulated electronically, which are then converted back into optical signals. However, the development of all-optical WDM communication systems has necessitated the need for all-optical wavelength selective devices. It is desirable for such devices to exhibit the properties of low insertion loss, insensitivity to polarization, good spectral selectivity, and ease of manufacturing.

In general, there are three prevailing types of technology commonly implemented in the all-optical Dense WDM (DWDM) networks: (1) Thin Film Filter (TFF), (2) Arrayed Waveguide Gratings (AWG), and (3) Fiber Bragg Grating (FBG). Among these three types of implementations, TFF technology is the predominant choice when the channel spacing is greater than 100 GHz. The advantages of TFF-based devices are that they are relatively insensitive to temperature, have minimal cross talk, and provide good isolation between different wavelengths. However, devices built using current TFF technology have the following disadvantages: they are difficult to manufacture when the channel spacing is below 200 GHz; the packaging cost is very high; and the yield is low. Due to these disadvantages, when the channel spacing is 100 GHz or less, AWG and FBG wavelength selecting devices dominate the market. The advantages of AWG devices are they can support high channel counts, are easy to manufacture, and have a small footprint. Meanwhile, the disadvantages are that AWG devices are prone to cross talk and their packaging is complex. The second dominant technology, i.e., the FBG technology, has the advantages of short development time, low capital investment, and low packaging cost as channel spacing is reduced to 100 GHz or less. However, the FBG products available in the current market have relatively high loss. Moreover, each channel requires a circulator, which increases component costs and possibly increases packaging costs.

Furthermore, there are several optical switching technologies under development today. They are as follows: Micro Electro-Mechanical Systems (MEMS), Liquid Crystals, Thermal Optics, Holograms, Acousto-Optic, etc. Among all these optical switching technologies, MEMS is emerging to be the most promising technology, as benefited from its potential of batch processing and cheap replication, as well as its sound record on reliability in a wide range of applications. All the other technologies are still in the experimental stage and need years to become reliable enough for commercial applications. Different embodiments of MEMS optical switches are made available in the marketplace that are implemented with a de-multiplexing device to first separate the input signals into multiple channels (each having a specific central wavelength) transmitted over a specific waveguide. Optical switching operations are performed for each of these de-multiplexed signals. Then a device is employed to multiplex these switched signals for transmission over optical fibers. Alternately, the wavelength selective optical switches are implemented with a de-multiplexing device to first separate the optical signal into channels of different wavelengths. The optical switching operations are carried out for each channel and these channels are connected to optical output ports. Again, a de-multiplexing operation must be performed first before wavelength selective switching can be carried out.

There are two types of optical MEMS switch architectures under development, or commercially available: mechanical and micro-fluidic. Mechanical-type MEMS-based switches use arrays of miniaturized mirrors fabricated on a single chip. The optical signal is reflected off this tiny mirror in order to change the transmission channel. Micro-fluidic-type MEMS-based switches, on the other hand, have no moving mirrors. Rather, they rely on the movement of bubbles in micro-machined channels.

Mechanical-type MEMS-based switches can be further classified into two categories according to mirror movement: two-dimensional (2-D) switches and three-dimensional (3-D) switches. In 2-D switches, the mirrors are only able to execute a two-position operation—that is, the mirrors can move either up and down or side by side. In 3-D switches, the mirrors can assume a variety of positions by swiveling in multiple angles and directions. These products (2-D switches or 3-D switches) are able to offer such benefits as excellent optical performance, minimal cross-talk, and the promise of improved integration, scalability, and reliability. On the other hand, these products and their methods of use are disadvantageous in the following aspects, First, in these switches, light travels through free space, which causes unbalanced power loss. Secondly, in order to steer each mirror, three to four electrodes need to be connected to each mirror, which is a major challenge to produce large-scale mechanical-type MEMS-based switches. Thirdly, alignment and packaging are difficult tasks particularly for large-scale switches.

While above-mentioned micro-mirror-based approach is widely taken by most major companies to build up their MEMS-based optical switches, Agilent Technology, Inc. has developed micro-fluidic-type MEMS-based switches by combining its micro-fluidics and ink-jet printing technology. In these switches, an index-matching fluid is used to switch wavelengths. This fluid enables transmission in a normal condition. To direct light from an input to another output, a thermal ink-jet element creates a bubble in the fluid in a trench located at the intersection between the input waveguide and the desired output waveguide, reflecting the light by total internal reflection. The advantages of these switches are that they have no moving mechanical parts and are polarization independent. The disadvantages are their questionable reliability and the excessive insertion loss for large-scale switches.

A common drawback of both of these MEMS-based switches is the requirement to work with external de-multiplexing and re-multiplexing devices in order to function properly in an optical networking system. The requirements of implementing de-multiplexing and re-multiplexing functions add tremendous complexities to the system configuration and significantly increase the cost of manufacture, system installation, and maintenance of the optical network systems. Another drawback is that these prior-art switching systems are not wavelength selective switches. In another words, switching systems based on MEMS cannot selectively switch a particular wavelength from an input waveguide to a desired output waveguide. In short, they are not wavelength intelligent devices.

To add wavelength intelligence to optical switches, Bragg grating has been shown to have excellent wavelength selection characteristics. A Bragg grating behaves as a wavelength-selective filter, reflecting a narrow band of wavelengths while transmitting all other wavelengths. The Massachusetts Institute of Technology (MIT) has developed a technology for building Bragg grating devices in planar optical waveguides. These so-called integrated Bragg gratings offer many advantages over the fiber Bragg grating, according to MIT. However, since switching optical signals requires routing of the optical transmission, a wavelength-selective filter alone is not sufficient to build an optical switch. In most waveguide grating device designs, since input signal and its reflective response occur within the same waveguide (see FIG. 1), circulators must be employed. One of the drawbacks of using circulators is that the circulators are expensive thus unduly increasing the implementation cost. For that reason, the grating assisted directional couplers (GADC) such as those shown in FIG. 2 are used. The optical performance characteristics of GADC and their dependence on material properties of the transmission medium are well-known, e.g., "Contra-directional coupling in grating-assisted guided-wave devices," Hong et al, IEEE Journal of Lightwave Technology, pp. 873, vol. 10, no. 7, Jul. 1992. Typically, four distinct wavelengths participate in the coupling process. Among these four wavelengths, only three of them are significant in our discussion. These 3 wavelengths are illustrated in FIGS. 3A and 3B. As shown in these drawings, the first response is reflection along the incident direction, the second response is reflection along the coupling waveguide (contra-directional propagation) and the third response is the forward transmission along the coupling waveguide (co-directional propagation). Based on the utilizations of these optical responses between the grating assisted coupling waveguides, many different devices according to different combination of configurations are disclosed for varieties of application in controlling, switching and managing signal transmissions in optical networks.

Specifically, Horita et al. disclosed in U.S. Pat. No. 5,859,941, entitled "Optical Add/Drop Multiplexer Device", an add/drop multiplexer device provided to extract or inserting optical signals or arbitrary wavelength and having a wavelength selection characteristic with a narrow bandwidth. The multiplexer device is formed on a substrate implemented with a layered structure. In another U.S. Pat. No. 6,567,573, entitled "Switchable Optical Components" issued on May 20, 2003, Domash et al. disclosed electrically switchable Bragg grating devices and device geometries realized by using holographic polymer or dispersed liquid crystal materials.

However, these patented technologies have technical limitations due to the interference of signal transmissions may occur when the wavelength of the reflected waves falls within the optical communication band as will be further explained below in FIG. 4. As a result, performance degradation of the telecommunication networks is possible if not properly managed.

Therefore, a need still exists in the art to provide an innovative configurations and method of manufacturing and designing the wavelength selective optical devices to overcome such limitations.

SUMMARY OF THE INVENTION

It is therefore an object of the present invention to provide new and improved methods and configurations for wavelength selective optical transmission system with coupling waveguides having wavelength selective Bragg gratings wherein the coupling waveguides are coupled based selection rules to reduce cross-talk between channels and to increase signal coupling of the optical transmissions between two waveguides. Specifically, the coupling waveguides are selected to have different optical propagation constant. In specific embodiments the coupling waveguides have different sizes and shape of cross sections. In another different embodiment, the coupling waveguides have different thickness to width ratios, i.e., different aspect ratios, to enhance the coupling of signals between the two adjacent waveguides.

Briefly, the present invention discloses a method for configuring a wavelength selective optical signal transmission system. The method includes a step of providing a set of Bragg gratings on at least one of two coupled waveguides near an interfacing section between the coupled waveguides. The method further includes a step of selecting a second waveguide such that the set of wavelength-selective Bragg gratings are to reflect a reflecting optical signal back to the first waveguide and for transmitting a contra-directional optical signal and a co-directional optical signal having respectively a contra-directional selected wavelength and a co-directional selected wavelength corresponding to the Bragg gratings wherein one of the contra-directional and co-directional wavelengths is chosen as a designated wavelength, and the reflecting optical signal and one of the contra-directional or co-directional optical signals are outside of a predefined range surrounding the designated wavelength.

In accordance with the invention, the optical device includes wavelength-selective optical transmission system. The optical signal transmission system includes a first and a second waveguides. The second waveguide disposed on a vertically stacked position on the first waveguide and at least one of the first and second waveguides have a set of wavelength selective Bragg gratings disposed near a coupling section between the first and second waveguides wherein the first and second waveguides have different optical propagation constants. In a specific embodiment, the first and second waveguides are composed of different optical transmission materials. In another preferred embodiment, the first and second waveguides have different sizes and shape of cross sections.

BRIEF DESCRIPTIONS OF THE DRAWINGS

The present invention can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENT

In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention. Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
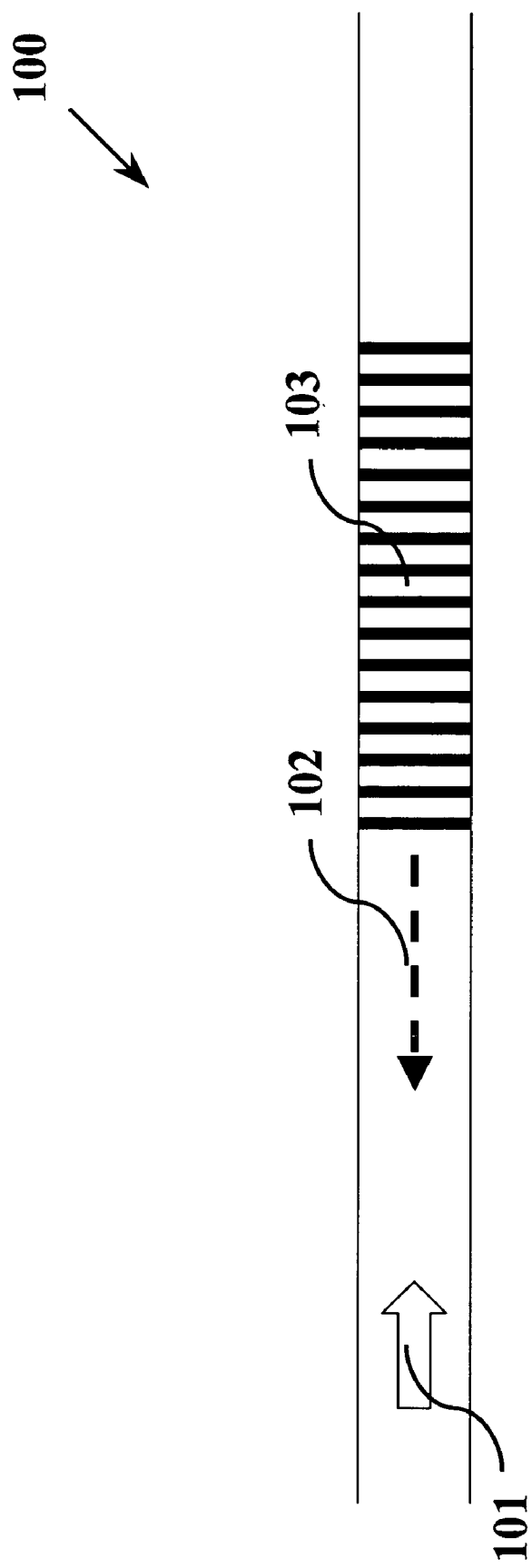
FIG. 1 is a schematic diagram showing a typical waveguide grating device with input signal and the reflective response propagating within the same waveguide.

A typical waveguide grating device is shown in FIG. 1 with input signal 101 and the reflective response 102 propagate within the same waveguide. Circulators, which are expensive, will be necessary in this case to extract the response signal.

Figure 2:
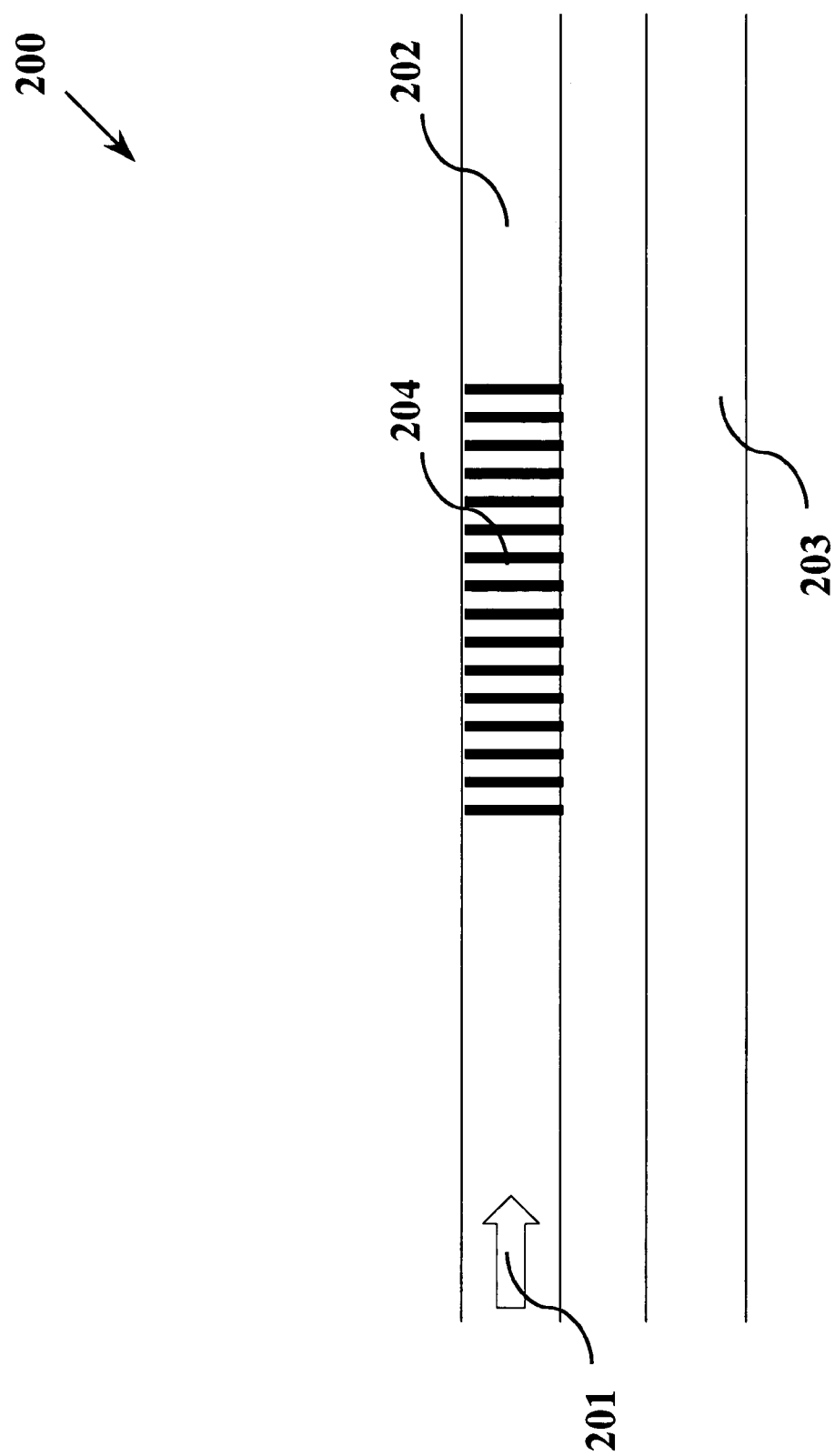
FIG. 2 is a schematic diagram of a grating assisted directional coupler device.

Referring to FIG. 2 for a schematic diagram for showing the functioning of a grating assisted directional coupler, in which waveguide 203 coupled with the wavelength selective waveguide 202. Sets of Bragg gratings 204 are formed on waveguide 202. A multiplexed optical signal 201 is transmitted in waveguide 202 over N wavelengths $\lambda_1$, $\lambda_2$, $\lambda_3$, ..., $\lambda_N$ where N is a positive integer. Contrary to the waveguide grating device shown in FIG. 1, this grating assisted directional coupler does not require the use of circulators for the extraction of the response signal.

As is well understood in literature (see, for example, Ramaswami, R., *Optical Networks: A Practical Perspective*, Section 3.3.2, Academic Press, 1998), a Bragg grating refers to any periodic perturbation or variation in the propagating medium. A Bragg grating, therefore, may come about as a periodic variation of either the refractive index of the propagating medium, the structure of the propagating medium, or both.

Figure 3A:
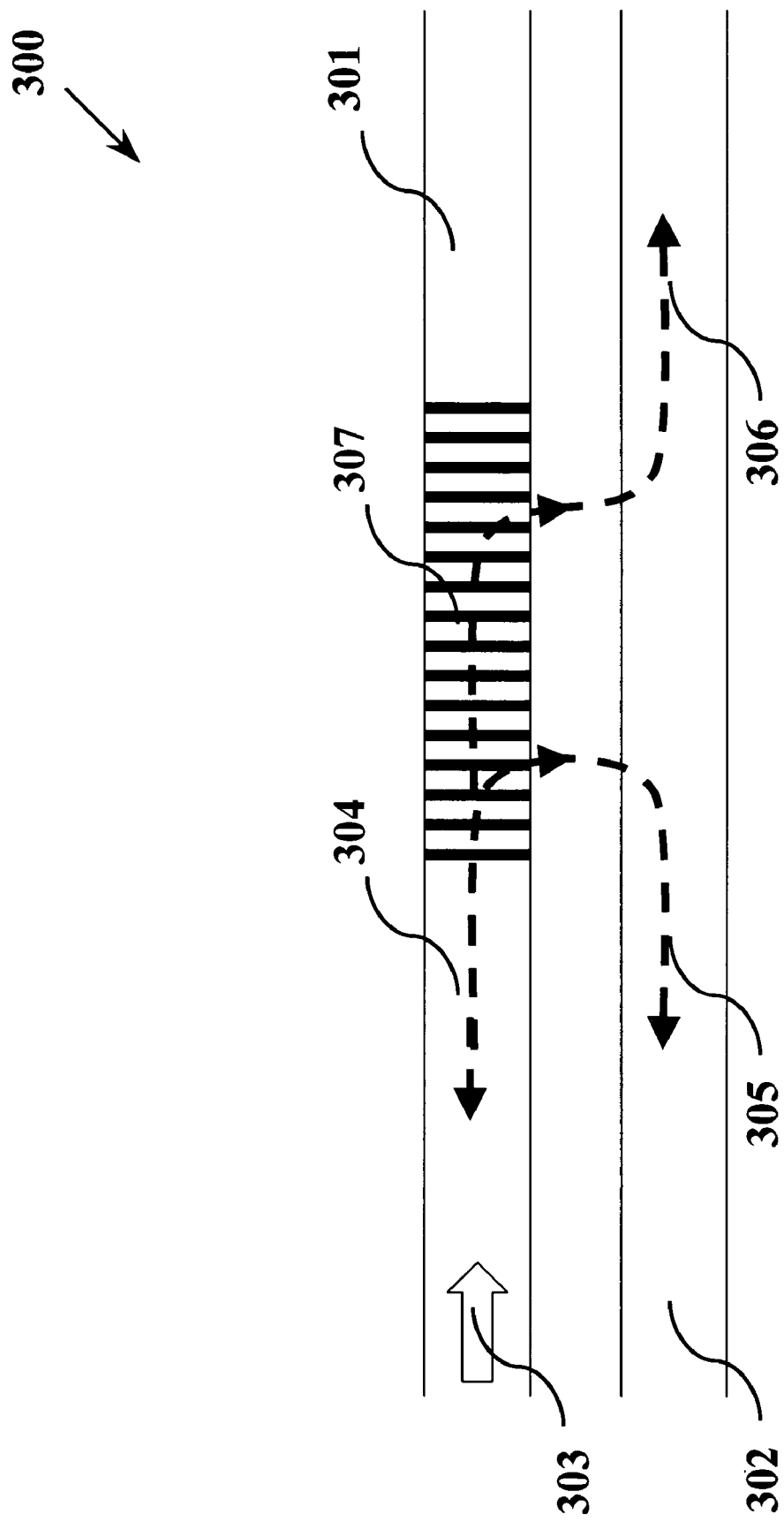
FIG. 3A illustrates a grating assisted directional coupler device design with gratings fabricated on the input waveguide.
Figure 3B:
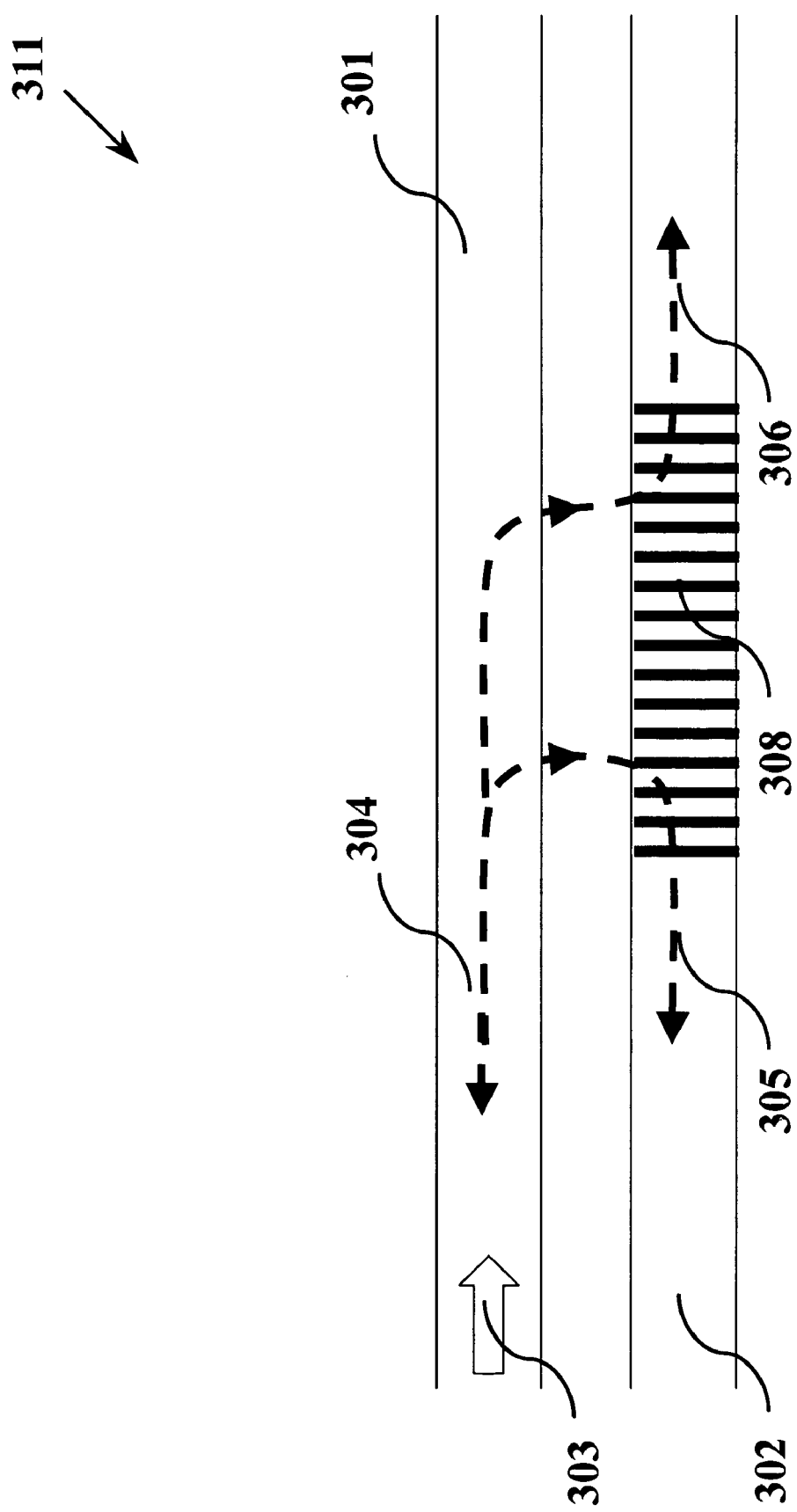
FIG. 3B illustrates a grating assisted directional coupler device design with gratings 308 fabricated on the output waveguide.
Figure 3C:
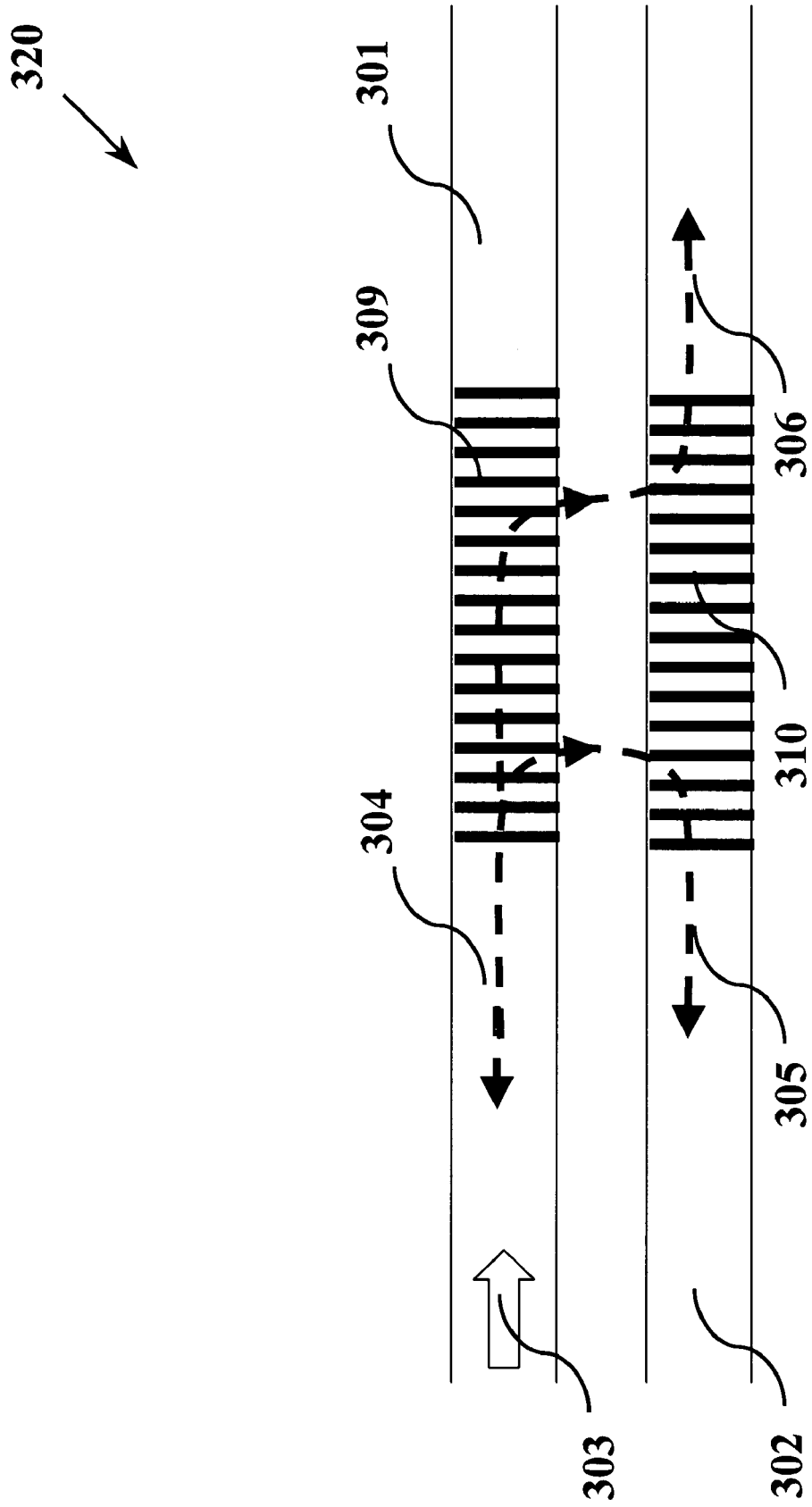
FIG. 3C illustrates a grating assisted directional coupler device design with gratings fabricated on both the input and output waveguides.

The three main classes of grating assisted directional coupler device design are illustrated in FIGS. 3A to 3C. In particular, (a) sets of Bragg gratings 307 are formed on waveguide 301 as in FIG. 3A, (b) sets of Bragg gratings 308 are formed on waveguide 302 as in FIG. 3B, and (c) sets of Bragg gratings 309 and 310 are formed on both waveguides 301 and 302 as in FIG. 3C.

Other designs where the Bragg gratings are formed in the cladding, although not explicitly depicted here, are feasible and therefore implied.

Referring to FIG. 3A, an input optical signal 303 is transmitted in waveguide 301 over N wavelengths $\lambda_1$, $\lambda_2$, $\lambda_3$, ..., $\lambda_N$ where N is a positive integer, which is coupled to waveguide 302 such that (a) a contra-directional coupling signal 305 with a central wavelength $\lambda_i$ particular to the Bragg gratings is guided into waveguide 302, (b) a co-directional coupling signal 306 with a central wavelength $\lambda_j$ particular to the Bragg gratings 307 is guided into waveguide 302, and (c) a direct Bragg reflective signal 304 with a central wavelength $\lambda_k$ particular to the Bragg gratings is guided into waveguide 301.

If the grating assisted directional coupler device is designed such that only contra-directional coupling is to be utilized, wavelength $\lambda_i$ would be one of the aforementioned N wavelengths but wavelengths $\lambda_j$ and $\lambda_k$ would be outside of the set of aforementioned N wavelengths. In other words, signals 304 and 306 would carry no optical power. The remainder optical signal of the wavelengths $\lambda_1, \lambda_2, \ldots, \lambda_{i-1}, \lambda_{i+1}, \ldots, \lambda_N$ is not affected and continues to propagate along waveguide 301.

For the purpose of signal transmission in the telecommunication network, optical signals of certain range of wavelengths are employed, e.g., C-band optical signals are limited within a range of 1529.75~1569.59 nm. It is a common practice to assume some margin to allow for random fluctuations in process and/or material non-uniformity. In the case when this margin is set at 5 nm, for example, one may consider setting as set forth below:

$\lambda_{min} = 1529.75 - 5 = 1524.75$ nm; and $\lambda_{max} = 1569.59 + 5 = 1574.59$ nm The gratings structure of our switches is designed such that contra-directional coupling, co-directional coupling and direct Bragg reflection occur at specific wavelengths. Depending on which coupling mechanism is to be utilized, the specific wavelength corresponding to the particular coupling mechanism falls within the bandwidth of interest, (e.g. the C-band). For example, if only contra-directional coupling is to be utilized, it is desirable that the wavelengths specific to co-directional coupling and direct Bragg reflection are outside of the bandwidth of interest.

Similar considerations are applicable for designs where the Bragg gratings 308 are formed only on waveguide 302 as in FIG. 3B, designs where the Bragg gratings 309 and 310 are formed on both waveguides 301 and 302 as in FIG. 3C, and designs (although not depicted here) where the Bragg gratings are formed in the cladding.

Figure 4A:
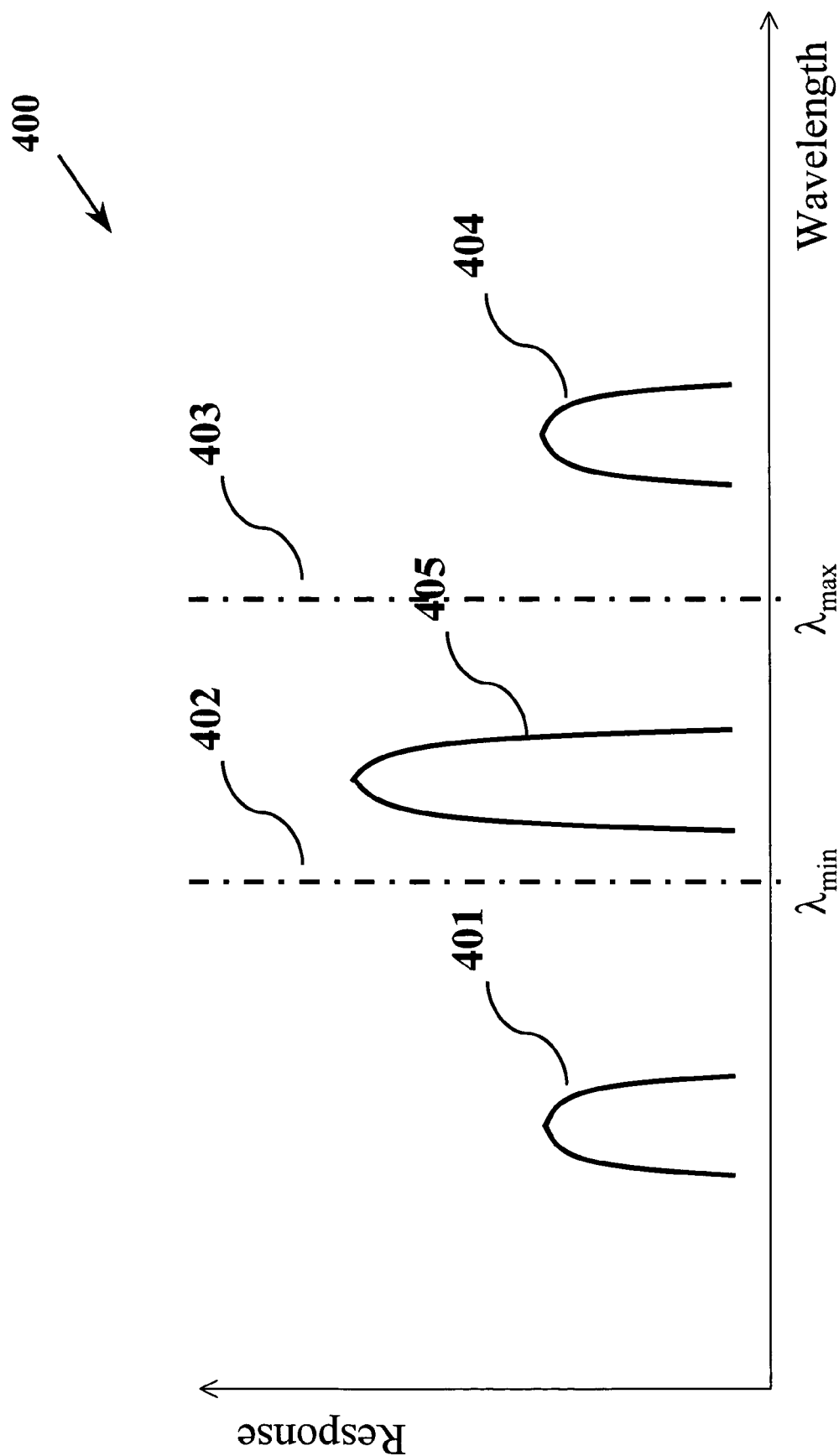
FIGS. 4A to 4C are graphs showing all possible combinations of the three responses of a grating assisted directional coupler device as a function of input signal.
Figure 4B:
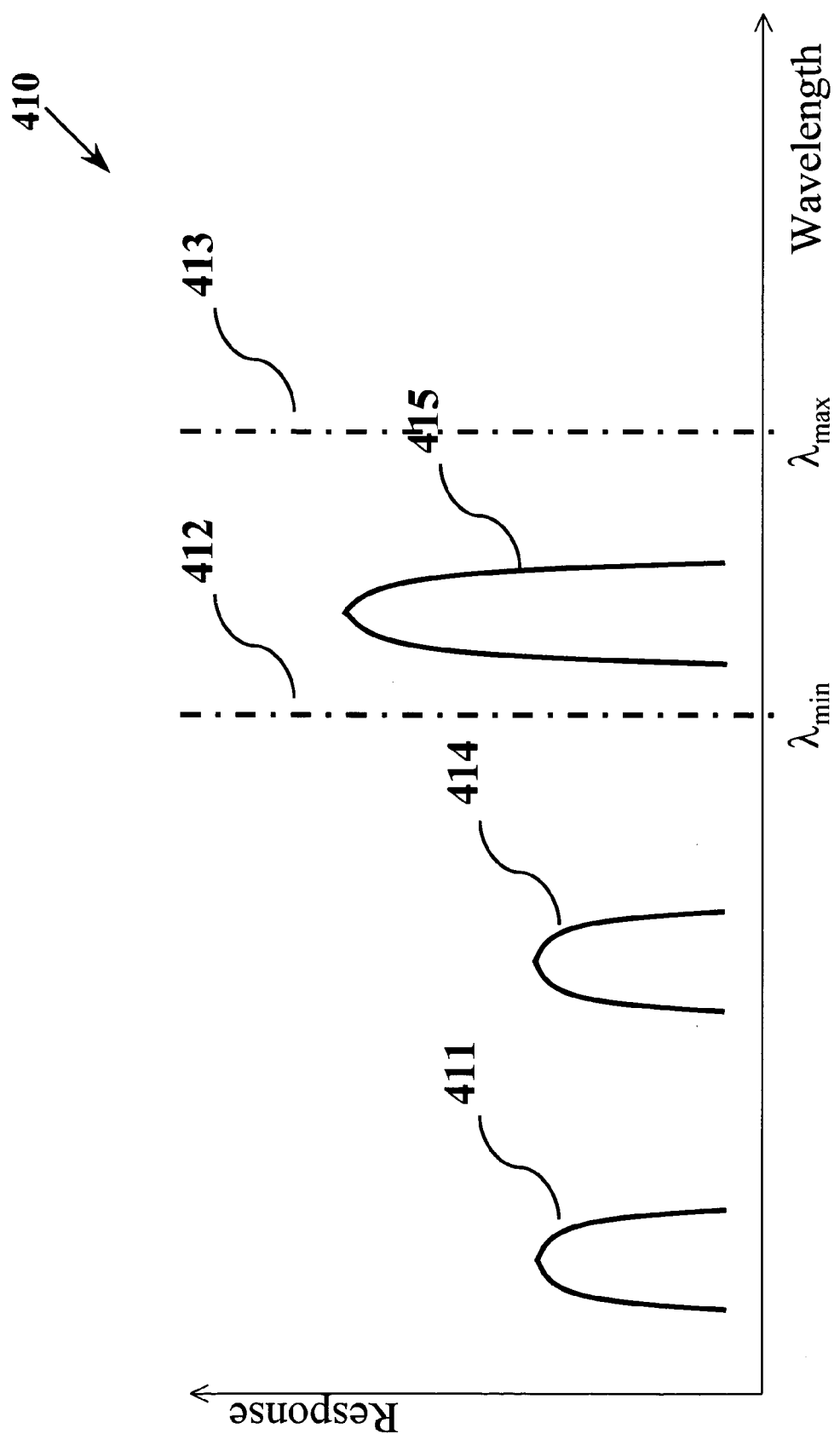
Figure 4C:
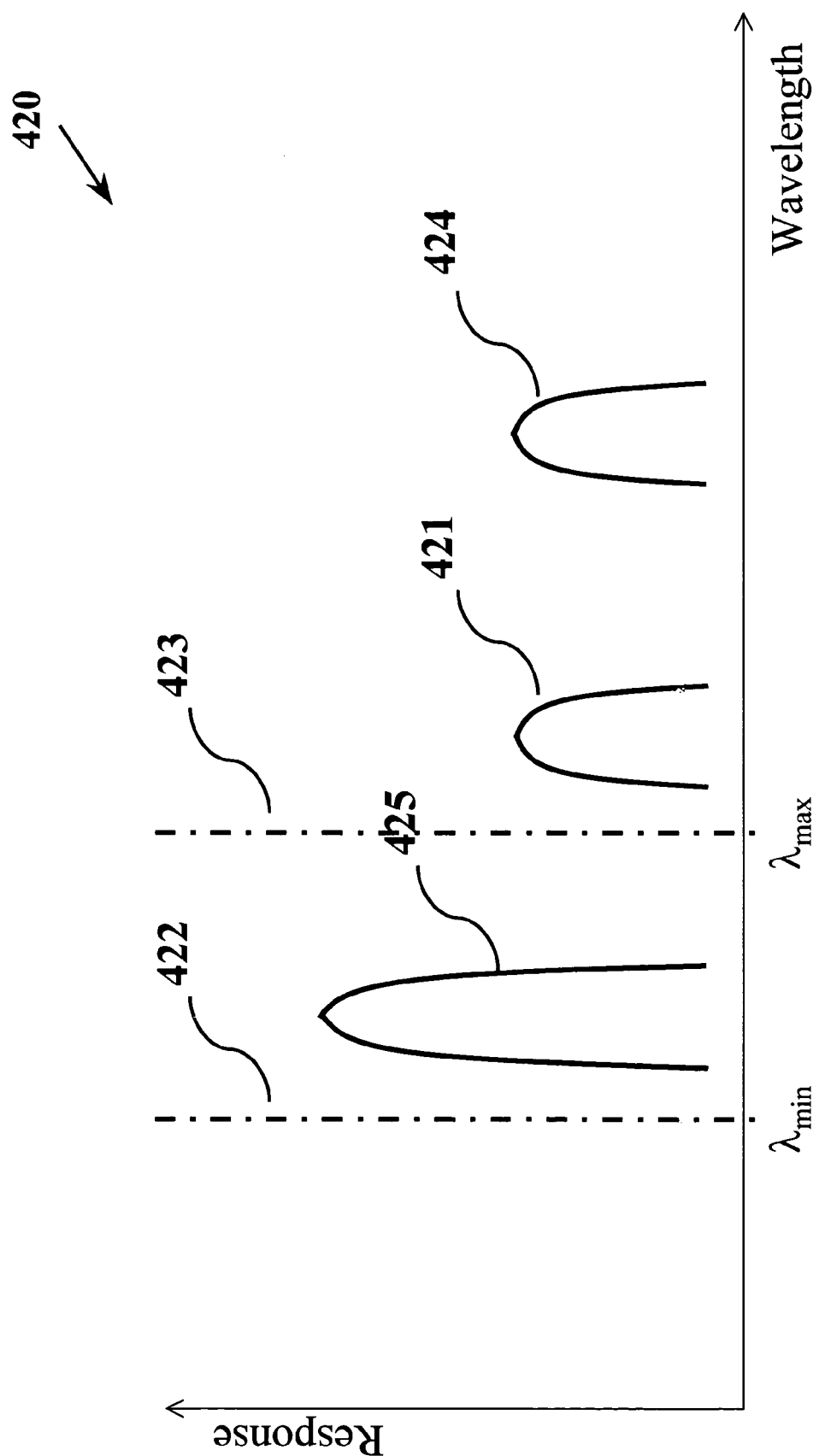

Refer to FIG. 4A for an implementation of this invention. FIG. 4A shows a range of wavelengths that is designated between $\lambda_{max}$ and $\lambda_{min}$ for the purpose of signal transmission in a telecommunication network. Special attention in material selection and geometry of the coupled waveguides are necessary to take into account, as will be further described below, that the unwanted responses are to occur at wavelengths greater than $\lambda_{max}$ or less than $\lambda_{min}$. As an illustration, FIGS. 4A to 4C show all possible combinations of the three possible combinations of the three responses of a grating assisted directional coupler device as a function of input signal. As a result of these considerations, performance of signal transmissions is improved because the unwanted responses will not interfere with the signal transmissions within the range of useful wavelengths.

Referring to FIGS. 3A to 3C again, if the signal 305 (contra-directional coupling) is utilized, the wavelength $\lambda_R$ at which it occurs is $$\lambda_R = \frac{\lambda}{2\pi}(\beta_1 + \beta_2)\Lambda \quad (1)$$

It should be specified that in (1),
- (a) $\lambda$ denotes the optical signal wavelength in vacuum,
- (b) $\beta_1$ denotes the propagation constant of waveguide 301 particular to optical signal with wavelength $\lambda$,
- (c) $\beta_2$ denotes the propagation constant of waveguide 302 particular to optical signal with wavelength $\lambda$, and
- (d) $\Lambda$ denotes the period of the gratings.

More generally, concerning the two waveguides in a grating assisted directional coupler such as those illustrated in FIGS. 3A to 3C, in the descriptions henceforth
- (a) $\beta_1$ pertains to the waveguide on which an input optical signal of N wavelengths $\lambda_1, \lambda_2, \lambda_3, \ldots, \lambda_N$ (where N is a positive integer) is transmitted,
- (b) $\beta_2$ pertains to the waveguide into which an optical signal with a central wavelength $\lambda_i$ particular to the Bragg gratings is introduced by means of coupling.

If the wave number k is given by $$k = \frac{2\pi}{\lambda} \quad (2)$$

Then (1) can be rewritten as $$k\lambda_R = (\beta_1 + \beta_2)\Lambda \quad (3)$$

It is also necessary to avoid crosstalk due to (a) response 306 (co-directional coupling); and (b) response 304 (direct Bragg reflection). To be more precise, the wavelength $\lambda_{BC}$ at which co-directional coupling (response 306) occurs is given by $$k\lambda_{BC} = (\beta_2 - \beta_1)\Lambda \quad (4)$$

Similarly, the wavelength $\lambda_{B1}$ pertains to direct Bragg reflection (response 304) is given by $$k\lambda_{B1} = 2\beta_1 \Lambda \quad (5)$$

As mentioned earlier, it is necessary to make sure that these wavelengths are outside of our bandwidth of interest. This is illustrated in FIGS. 4A to 4C. For instance in FIG. 4A, let the bandwidth of interest be bounded by both $\lambda = \lambda_{min}$ 402 and $\lambda = \lambda_{max}$ 403, and the three responses due to the Bragg gratings are denoted by 401, 404 and 405. If only response 405 is to be utilized, it is desirable to design the gratings such that other responses such as 401 and 404 are beyond of the bandwidth boundaries. Similar considerations are extended to cases shown in FIGS. 4B to 4C. In order to achieve this goal, the following selection rules are set to cover several preferred embodiments according to the selection rules as described below.

Selection Rules

Application of the Contra-directional Coupling Signal 305

The two special cases that need to be considered are (1) when $\beta_1 < \beta_2$; and (2) when $\beta_1 < \beta_2$ Case 1: Application of the Contra-directional Coupling Signal 305 with $\beta_1 < \beta_2$ It should be noticed that in this case, from (3), (4) and (5) we have
(i) $\lambda_R > \lambda_{B1}$; and
(ii) $\lambda_R > \lambda_{BC}$.

As a result this case can be further subdivided into two sub-cases, as follows.

Embodiment 1a: Application of the Contra-directional Coupling Signal 305 with $\beta_1 < \beta_2$ and $\lambda_{B1} > \lambda_{BC}$ If the window of wavelength is limited (within the desired range that are interested in) to between $\lambda_{min}$ and $\lambda_{max}$, the grating period should be designed such that $$\lambda_{B1}^{(max)} < \lambda_{min} \quad (6)$$

In view of (5), this becomes $$2\beta_1 \Lambda_{max} < k\lambda_{min} \quad (7)$$

On the other hand, according to (3)

$$k\lambda_{max} = (\beta_1 + \beta_2)\Lambda_{max} \quad (8)$$

Combining (7) and (8), one obtains the selection rule for this case $$\frac{\lambda_{min}}{\lambda_{max}} > \frac{2\beta_1}{\beta_1+\beta_2} \quad (9)$$

Embodiment 1b: Application of the Contra-directional Coupling Signal 305 with $\beta_1<\beta_2$ and $\lambda_{B1}<\lambda_{BC}$ Similar to the previous situation, in this case, it is required that $$\lambda_{BC}^{(max)}<\lambda_{min} \quad (10)$$

Referring to (4), this means $$(\beta_2-\beta_1)\Lambda_{max}<\lambda_{min} \quad (11)$$

Combining (7) and (10), the selection rule for this case is given by $$\frac{\lambda_{min}}{\lambda_{max}} > \frac{\beta_2-\beta_1}{\beta_1+\beta_2} \quad (12)$$

Thus, from (9) and (12) we obtained a general selection rule for Case 1 when $\beta_1<\beta_2$ $$\frac{\lambda_{min}}{\lambda_{max}} > \max\left(\frac{2\beta_1}{\beta_1+\beta_2}, \frac{\beta_2-\beta_1}{\beta_1+\beta_2}\right) \quad (13)$$

Case 2: Application of the Contra-directional Coupling Signal 305 with $\beta_1>\beta_2$ Given the condition that $\beta_1>\beta_2$, from (3), (4) and (5), we have in this case $\lambda_{B1}>\lambda_R>\lambda_{BC}$.

Embodiment 2a: Application of the Contra-Directional Coupling Signal 305 with $\beta_1>\beta_2$ and $\lambda_{B1}>\lambda_R$ Under this situation it is required that $$\lambda_{B1}^{(min)}>\lambda_{max} \quad (14)$$

From (3) and (5), we have $$k\lambda_{min}=(\beta_1+\beta_2)\Lambda_{min} \quad (15)$$

$$k\lambda_{B1}^{(min)}=2\beta_1\Lambda_{min} \quad (16)$$

Putting these together, the selection rule in this case is found to be $$\frac{\lambda_{min}}{\lambda_{max}} > \frac{\beta_1+\beta_2}{2\beta_1} \quad (17)$$

Embodiment 2b: Application of the Contra-directional Coupling Signal 305 with $\beta_1>\beta_2$ and $\lambda_R>\lambda_{BC}$ This means that even in the extreme case, it is necessary that $$\lambda_{BC}^{(max)}<\lambda_{min} \quad (18)$$

Recall (3) and (4) such that $$k\lambda_{max}=(\beta_1+\beta_2)\Lambda_{max} \quad (19)$$

$$k\lambda_{BC}^{(max)}=(\beta_1-\beta_2)\Lambda_{max} \quad (20)$$

Combining (18), (19) and (20), one obtains the selection rule for this case $$\frac{\lambda_{min}}{\lambda_{max}} > \frac{\beta_1-\beta_2}{\beta_1+\beta_2} \quad (21)$$

To summarize, from (17) and (21), the general selection rule for Case 2 when $\beta_1>\beta_2$ is found to be $$\frac{\lambda_{min}}{\lambda_{max}} > \max\left(\frac{\beta_1+\beta_2}{2\beta_1}, \frac{\beta_1-\beta_2}{\beta_1+\beta_2}\right) \quad (22)$$

Application of the Co-directional Coupling Signal 306

Referring to FIG. 3A again, in the case of application of the co-directional coupling signal 306, the wavelength $\lambda_T$ at which it occurs is $$k\lambda_T=|\beta_1-\beta_2|\Lambda \quad (23)$$

The wavelengths pertain to (a) response 305 (contra-directional coupling); and (b) response 304 (direct Bragg reflection) are respectively given by $$k\lambda_{BC}=(\beta_1+\beta_2)\Lambda \quad (24)$$

and $$k\lambda_{B1}=2\beta_1\Lambda \quad (25)$$

As in the previous case, to ascertain these wavelengths to be outside of our bandwidth of interest several special cases need to be considered.

Case 3: Application of the Co-directional Coupling Signal 306 with $\beta_1<\beta_2$ From (23), (24) and (25) and given the condition that $\beta_1<\beta_2$ there are 2 possible cases to consider:
(i) $\lambda_T<\lambda_{B1}$; or
(ii) $\lambda_{B1}<\lambda_T<\lambda_{BC}$.

Embodiment 3a: Application of the Co-directional Coupling Signal 306 with $\beta_1<\beta_2$ and $\lambda_T<\lambda_{B1}$ In this case it is demanded that $$\lambda_{B1}^{(min)}>\lambda_{max} \quad (26)$$

From (23) and (24) it follows with these relationships $$k\lambda_{min}=(\beta_2-\beta_1)\Lambda_{min} \quad (27)$$

$$k\lambda_{B1}^{(min)}=2\beta_1\Lambda_{min} \quad (28)$$

Combining (26), (27) and (28), the selection rule for this case is found to be $$\frac{\lambda_{min}}{\lambda_{max}} > \frac{\beta_2 - \beta_1}{2\beta_1} \tag{29}$$

Embodiment 3b: Application of the Co-directional Coupling Signal 306 with $\beta_1 < \beta_2$ and $\lambda_{B1} < \lambda_T < \lambda_{BC}$ In this case it is demanded that $$\lambda_{B1}^{(max)} < \lambda_{min} \tag{30}$$

$$\lambda_{max} < \lambda_{BC}^{(min)} \tag{31}$$

By considering (30) first. From (23) and (25), it follows that $$k\lambda_{max} = (\beta_2 - \beta_1)\Lambda_{max} \tag{32}$$

$$k\lambda_{B1}^{(max)} = 2\beta_1 \Lambda_{max} \tag{33}$$

By combining (30), (32) and (33), part one of the selection rule is thus obtained $$\frac{\lambda_{min}}{\lambda_{max}} > \frac{2\beta_1}{\beta_2 - \beta_1} \tag{34}$$

Next, by considering (31) and from (24) and (27), it follows that:

$$k\lambda_{BC}^{(min)} = (\beta_1 + \beta_2)\Lambda_{min} \tag{35}$$

$$k\lambda_{min} = (\beta_2 - \beta_1)\Lambda_{min} \tag{27}$$

Combining (31), (27) and (35), part two of the selection rule is found to be $$\frac{\lambda_{min}}{\lambda_{max}} > \frac{\beta_2 - \beta_1}{\beta_2 + \beta_1} \tag{36}$$

The selection rule for Embodiment 3b when $\beta_1 < \beta_2$ is therefore given by $$\frac{\lambda_{min}}{\lambda_{max}} > \max\left(\frac{2\beta_1}{\beta_2 - \beta_1}, \frac{\beta_2 - \beta_1}{\beta_2 + \beta_1}\right) \tag{37}$$

In summary, the general selection rule for Case 3 is $$\frac{\lambda_{min}}{\lambda_{max}} > \min\left[\max\left(\frac{2\beta_1}{\beta_2 - \beta_1}, \frac{\beta_2 - \beta_1}{\beta_2 + \beta_1}\right), \frac{\beta_2 - \beta_1}{2\beta_1}\right]$$

Case 4: Application of the Co-Directional Coupling Signal 306 with $\beta_1 > \beta_2$ Again, from (23), (24) and (25) and given the condition that $\beta_1 > \beta_2$ there are two possible cases to consider:
(i) $\lambda_T < \lambda_{BC}$; and
(ii) $\lambda_T < \lambda_{B1}$.

Embodiment 4a: Application of the Co-Directional Coupling Signal 306 with $\beta_1 > \beta_2$ and $\lambda_T < \lambda_{BC}$ It is required that $$\lambda_{BC}^{(min)} > \lambda_{max} \tag{38}$$

From (27) and (35) we have these relationships $$k\lambda_{min} = (\beta_1 - \beta_2)\Lambda_{min} \tag{27}$$

$$k\lambda_{BC}^{(min)} = (\beta_1 + \beta_2)\Lambda_{min} \tag{35}$$

Combining (38), (27) and (35), the selection rule for this case is found to be $$\frac{\lambda_{min}}{\lambda_{max}} > \frac{\beta_1 - \beta_2}{\beta_1 + \beta_2} \tag{39}$$

Embodiment 4b: Application of the Co-Directional Coupling Signal 306 with $\beta_1 > \beta_2$ and $\lambda_T < \lambda_{B1}$ This is similar to Embodiment 3a. The conclusion is therefore similar. The selection rule for this case is found to be $$\frac{\lambda_{min}}{\lambda_{max}} > \frac{\beta_1 - \beta_2}{2\beta_1} \tag{40}$$

To summarize, the general selection rule for Case 4 is given by $$\frac{\lambda_{min}}{\lambda_{max}} > \max\left(\frac{\beta_1 - \beta_2}{\beta_1 + \beta_2}, \frac{\beta_1 - \beta_2}{2\beta_1}\right) = \frac{\beta_1 - \beta_2}{\beta_1 + \beta_2} \tag{41}$$

Below is a table to sum up the selection rules derived so far:

TABLE 1

| | | |
|---|---|---|
| Contra-directional Coupling (Response 305) | $\beta_1 < \beta_2$ | $\frac{\lambda_{min}}{\lambda_{max}} > \max\left(\frac{2\beta_1}{\beta_1 + \beta_2}, \frac{\beta_2 - \beta_1}{\beta_1 + \beta_2}\right)$ |
| Contra-directional Coupling (Response 305) | $\beta_1 > \beta_2$ | $\frac{\lambda_{min}}{\lambda_{max}} > \max\left(\frac{\beta_1 + \beta_2}{2\beta_1}, \frac{\beta_1 - \beta_2}{\beta_1 + \beta_2}\right)$ |
| Co-directional Coupling (Response 306) | $\beta_1 < \beta_2$ | $\frac{\lambda_{min}}{\lambda_{max}} > \min\left[\max\left(\frac{2\beta_1}{\beta_2 - \beta_1}, \frac{\beta_2 - \beta_1}{\beta_2 + \beta_1}\right), \frac{\beta_2 - \beta_1}{2\beta_1}\right]$ |
| Co-directional Coupling (Response 306) | $\beta_1 > \beta_2$ | $\frac{\lambda_{min}}{\lambda_{max}} > \frac{\beta_1 - \beta_2}{\beta_1 + \beta_2}$ |

Consider the first row of Table 1. It is simple to conclude that if $\beta_1<\beta_2<3\beta_1$ then $$\frac{2\beta_1}{\beta_1+\beta_2} > \frac{\beta_2-\beta_1}{\beta_1+\beta_2} \qquad (42)$$

The converse is true if $\beta_2>3\beta_1$.

Based on the second row of Table 1, it is not difficult to conclude that if $(\sqrt{5}-2)\beta_1<\beta_2<\beta_1$ then $$\frac{\beta_1+\beta_2}{2\beta_1} > \frac{\beta_1-\beta_2}{\beta_1+\beta_2} \qquad (43)$$

For the converse to be true, it is necessary that $\beta_2<(\sqrt{5}-2)\beta_1$.

Simplification of the third row of Table 1 is a bit more complicated. We observe that if $\beta_1>(\sqrt{5}-2)\beta_2$, then $$\frac{2\beta_1}{\beta_2-\beta_1} > \frac{\beta_2-\beta_1}{\beta_2+\beta_1} \qquad (44)$$

So the initial conclusions are such that if $(\sqrt{5}-2)\beta_2<\beta_1<\beta_2$, then $$\frac{\lambda_{\min}}{\lambda_{\max}} > \min\left(\frac{2\beta_1}{\beta_2-\beta_1}, \frac{\beta_2-\beta_1}{2\beta_1}\right) \qquad (45)$$

Otherwise, that is if $\beta_1<(\sqrt{5}-2)\beta_2$, then $$\frac{\lambda_{\min}}{\lambda_{\max}} > \min\left(\frac{\beta_2-\beta_1}{\beta_2+\beta_1}, \frac{\beta_2-\beta_1}{2\beta_1}\right) = \frac{\beta_2-\beta_1}{\beta_2+\beta_1} \qquad (46)$$

Considering (45), it is easy to show that if $$\beta_1 > \frac{\beta_2}{3}, \text{ then}$$

$$\frac{2\beta_1}{\beta_2-\beta_1} > \frac{\beta_2-\beta_1}{2\beta_1} \qquad (47)$$

The converse is true if $\beta_1 < \frac{\beta_2}{3}$.

Thus, if $(\sqrt{5}-2)\beta_2 < \beta_1 < \frac{\beta_2}{3}$ then $$\frac{\lambda_{\min}}{\lambda_{\max}} > \frac{2\beta_1}{\beta_2-\beta_1} \qquad (48)$$

Else if $\frac{\beta_2}{3} < \beta_1 < \beta_2$ then $$\frac{\lambda_{\min}}{\lambda_{\max}} > \frac{\beta_2-\beta_1}{2\beta_1} \qquad (49)$$

As a result, Table 1 is simplified. The simplified selection rules are shown in Table 2.

TABLE 2

| Coupling Direction | Conditions | Selection Rules |
|---|---|---|
| Contra-directional (Response 305) | $\beta_2 > 3\beta_1$ | $\frac{\lambda_{\min}}{\lambda_{\max}} > \frac{\beta_2-\beta_1}{\beta_1+\beta_2}$ |
| Contra-directional (Response 305) | $\beta_1 < \beta_2 < 3\beta_1$ | $\frac{\lambda_{\min}}{\lambda_{\max}} > \frac{2\beta_1}{\beta_1+\beta_2}$ |
| Contra-directional (Response 305) | $(\sqrt{5}-2)\beta_1 < \beta_2 < \beta_1$ | $\frac{\lambda_{\min}}{\lambda_{\max}} > \frac{\beta_1+\beta_2}{2\beta_1}$ |
| Contra-directional (Response 305) | $\beta_2 < (\sqrt{5}-2)\beta_1$ | $\frac{\lambda_{\min}}{\lambda_{\max}} > \frac{\beta_1-\beta_2}{\beta_1+\beta_2}$ |
| Co-directional (Response 306) | $\beta_1 < (\sqrt{5}-2)\beta_2$ | $\frac{\lambda_{\min}}{\lambda_{\max}} > \frac{\beta_2-\beta_1}{\beta_2+\beta_1}$ |
| Co-directional (Response 306) | $(\sqrt{5}-2)\beta_2 < \beta_1 < \frac{\beta_2}{3}$ | $\frac{\lambda_{\min}}{\lambda_{\max}} > \frac{2\beta_1}{\beta_2-\beta_1}$ |
| Co-directional (Response 306) | $\frac{\beta_2}{3} < \beta_1 < \beta_2$ | $\frac{\lambda_{\min}}{\lambda_{\max}} > \frac{\beta_2-\beta_1}{2\beta_1}$ |
| Co-directional (Response 306) | $\beta_1 > \beta_2$ | $\frac{\lambda_{\min}}{\lambda_{\max}} > \frac{\beta_1-\beta_2}{\beta_1+\beta_2}$ |

Figure 5:
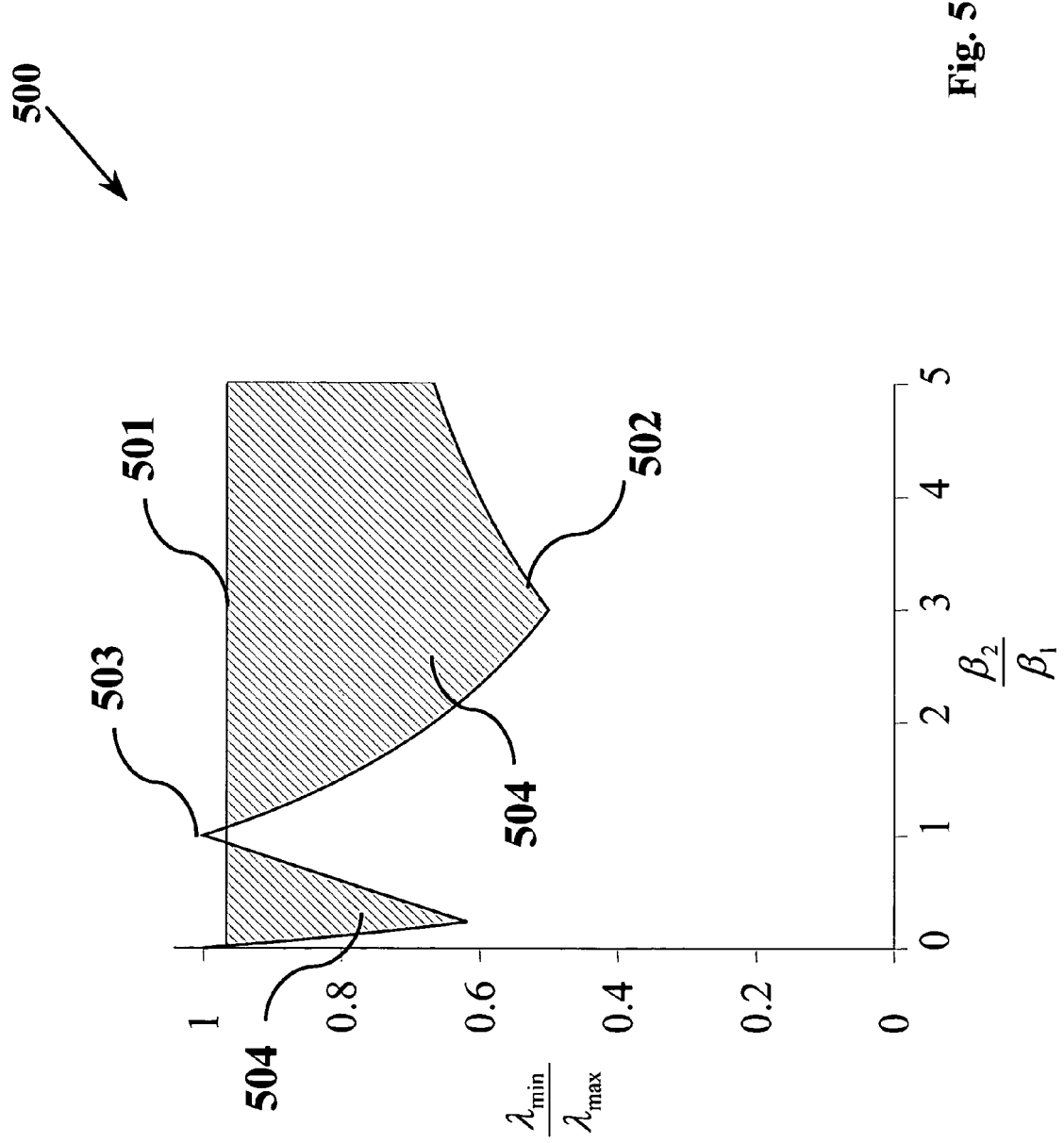
FIG. 5 is a graph for showing the selection rules for design of a grating assisted directional coupler where contra-directional coupling is utilized.

In particular, selection rules for the case of contra-directional coupling are presented as a graph shown in FIG. 5 where the horizontal axis denotes $$\frac{\beta_2}{\beta_1}$$

and the vertical axis denotes $$\frac{\lambda_{\min}}{\lambda_{\max}}.$$

Notice that the straight line 501 in FIG. 5 denotes the value of $$\frac{\lambda_{\min}}{\lambda_{\max}}$$

for C-band, which corresponds to roughly 0.975.

The selection rules for contra-directional coupling are manifested into such that only the regions (denoted by 504) above the curve 502 and below the straight line 501 are allowed. Note that according to FIG. 5, the selection rules dictate that $\beta_1 \neq \beta_2$ (represented as the tip of the spike of curve 502 which is denoted by 503). In other words, both the bus and the bridge waveguides must have different propagation constants. To satisfy the selection rules, it can be most easily achieved if both the waveguide material and waveguide geometry are different.

Figure 6A:
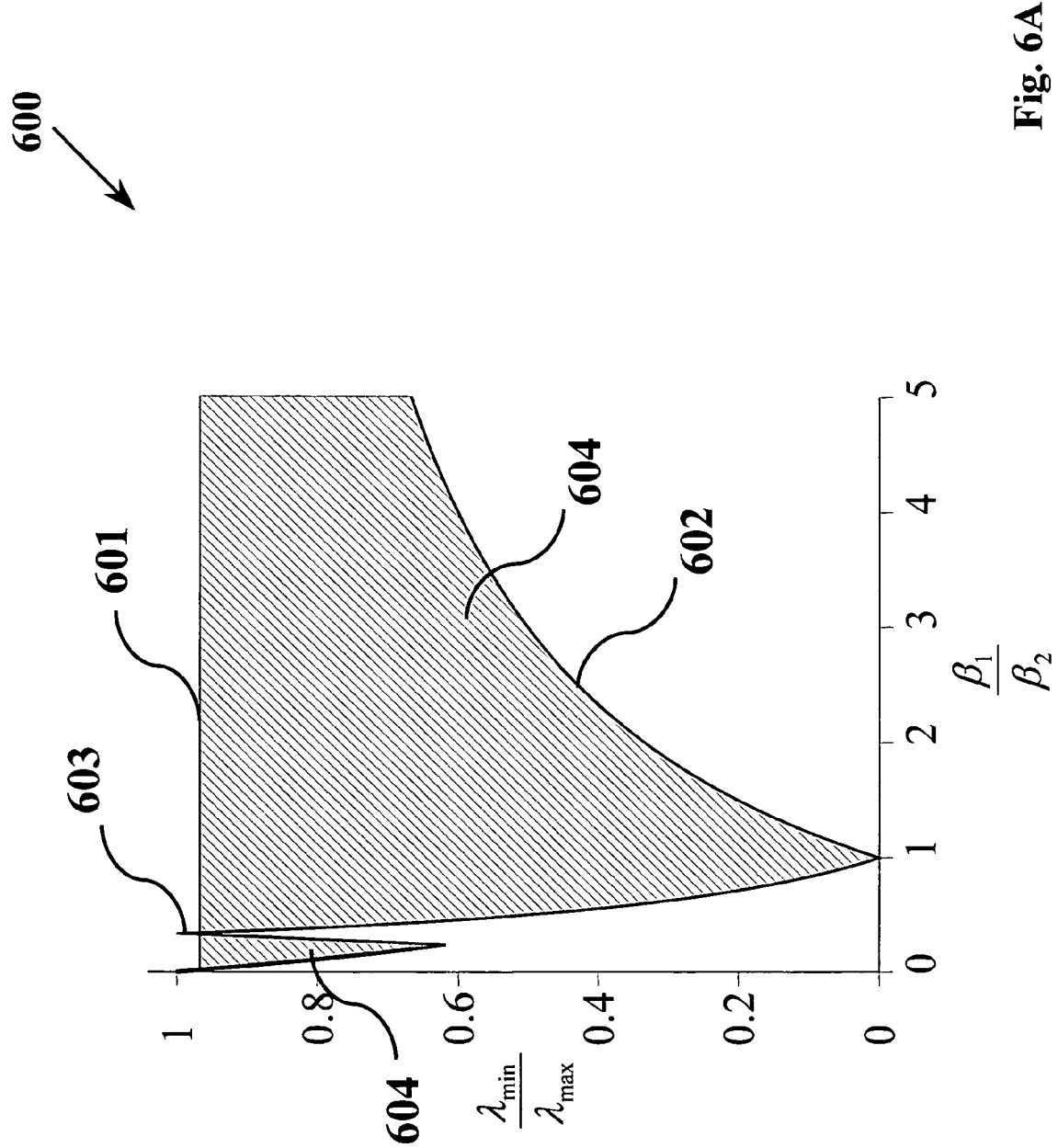
FIG. 6A to 6B are graphs for showing the selection rules for design of a grating assisted directional coupler where co-directional coupling is utilized.

Similarly, selection rules for the case of co-directional coupling are presented as a graph shown in FIG. 6A where the horizontal axis denotes $$\frac{\beta_1}{\beta_2}$$

and the vertical axis denotes $$\frac{\lambda_{min}}{\lambda_{max}}.$$

Figure 6B:
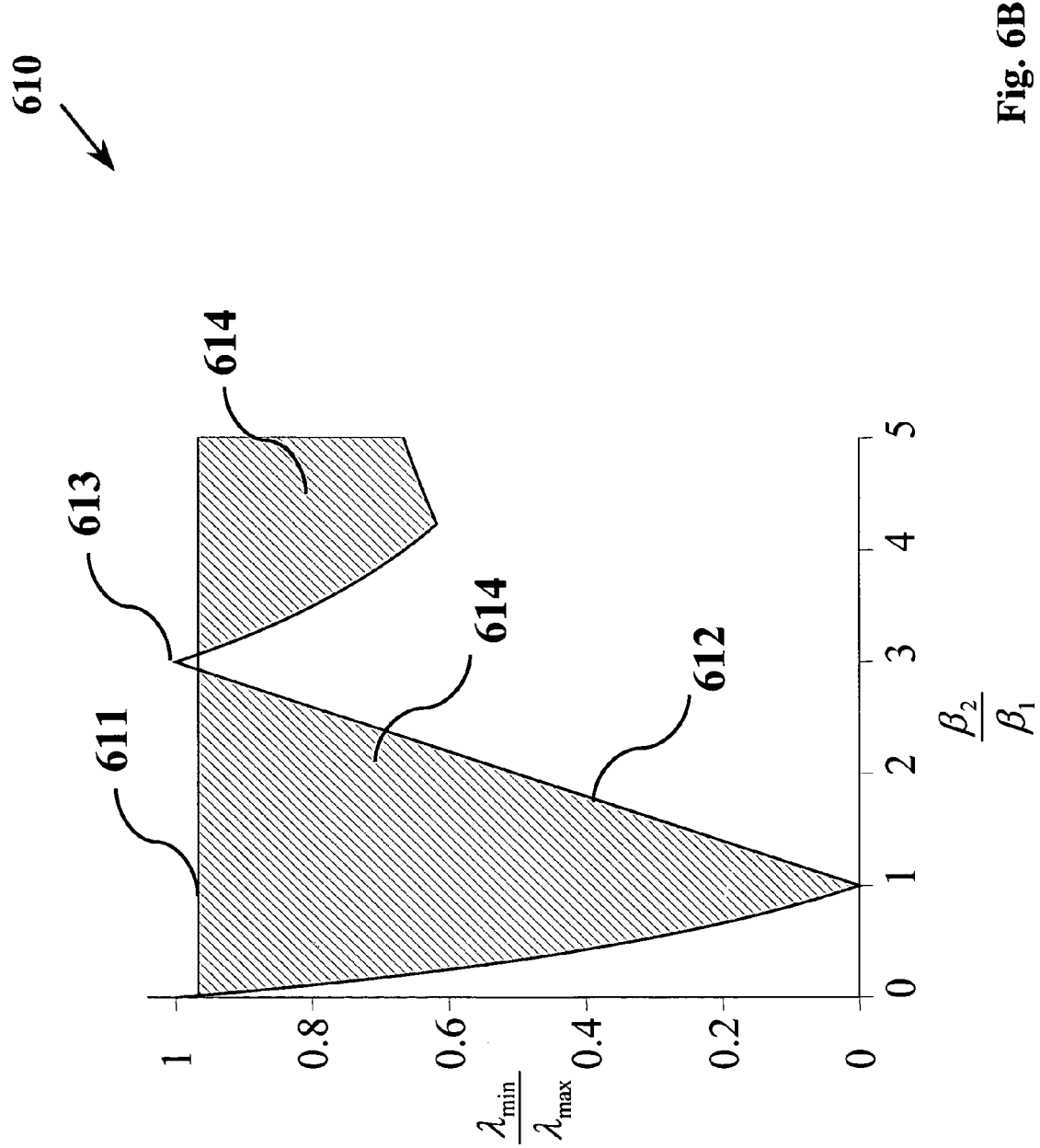

FIG. 6B is similar to FIG. 6A except for the fact that the horizontal axis in FIG. 6B denotes $$\frac{\beta_2}{\beta_1}.$$

Again, the straight lines 601 and 611 in, respectively, FIGS. 6A to 6B, denote the value of $$\frac{\lambda_{min}}{\lambda_{max}}$$

for C-band which, as mentioned earlier, corresponds to roughly 0.975.

As in the case of contra-directional coupling, the selection rules for co-directional coupling are translated, in terms of FIG. 6A, that regions (denoted by 604) above the curve 602 and below the straight line 601 are allowed. The major departure from FIG. 5 is that according to FIGS. 6A to 6B, the selection rules require that $\beta_2 \neq 3\beta_1$ (represented as the tip of the spike of curve 602 which is denoted by 603 in FIG. 6A, and the tip of the spike of curve 612 which is denoted by 613 in FIG. 6B, respectively). The material requirements for co-directional grating assisted coupler, as compared to contra-directional ones, are less demanding in practice.

From the selection rules, it is observed that the propagation constants of waveguide 301 and waveguide 302 must be significantly different, i.e. $\beta_1 \neq \beta_2$, in a contra-directional grating assisted waveguide coupler.

In recent years, process technology employed in fabrication of integrated optics circuitry is largely borrowed from silicon IC fabrication technology. If the waveguides shown in FIGS. 3A to 3C are fabricated on the same substrate and are co-planar, there are two methods to achieve the condition such that $\beta_1 \neq \beta_2$:

(a) waveguides fabricated with material with different refractive indices; or
(b) waveguides fabricated with same material but with significantly different geometry.

Method (a) is expensive and difficult to realize since extra masks and process steps are required. Method (b) is very limited due to two reasons. First, the thickness of both waveguides is necessarily similar as the process is complicated otherwise. By adjusting waveguide widths alone the difference in propagation constants is not expected to be large enough to satisfy any of the selection rules.

Referring to FIGS. 7, 8A to 8B, and 9A to 9B, several embodiments are proposed in order to circumvent these limitations. In these proposals, it is suggested that the two waveguides in a grating assisted directional coupler device be fabricated on two different levels. The process will be largely based on the silicon integrated circuit fabrication technology. (It must be emphasized that this is different from hybrid technology.)

Herein a novel vertically stacked waveguide structure is disclosed. It should be mentioned that vertically stacked waveguide structures are common in semiconductor (such as gallium arsenide or indium phosphide based) optical component design. There are several significant differences which distinguish the vertically stacked waveguide structure proposed here from the ones used in semiconductor optical components. First, it is proposed here that the two waveguides be made of different material. This is contrary to the semiconductor optical components in which the vertically stacked waveguides are made of the same material. Second, it is proposed here that the bus waveguides are designed (by using appropriate material and geometry) such that they can be coupled to fibers efficiently. In the case of semiconductor optical components, due to the high refractive index, coupling to fibers is typically not very effective.

By fabricating the input/output waveguides and the coupling waveguide on two different levels, design of each type of waveguides can be independent of each other. For example, the dimensions of the coupling waveguide can be very different from the input/output waveguides, and each type of waveguides can be fabricated using different material. In other words, both $\beta_1$ and $\beta_2$ can be chosen freely to satisfy the selection rules in Table 2. Another added advantage is that the gap between the input/output waveguide and the coupling waveguide, which significantly controls the grating assisted directional coupler device characteristics, can be controlled precisely.

Figure 7:
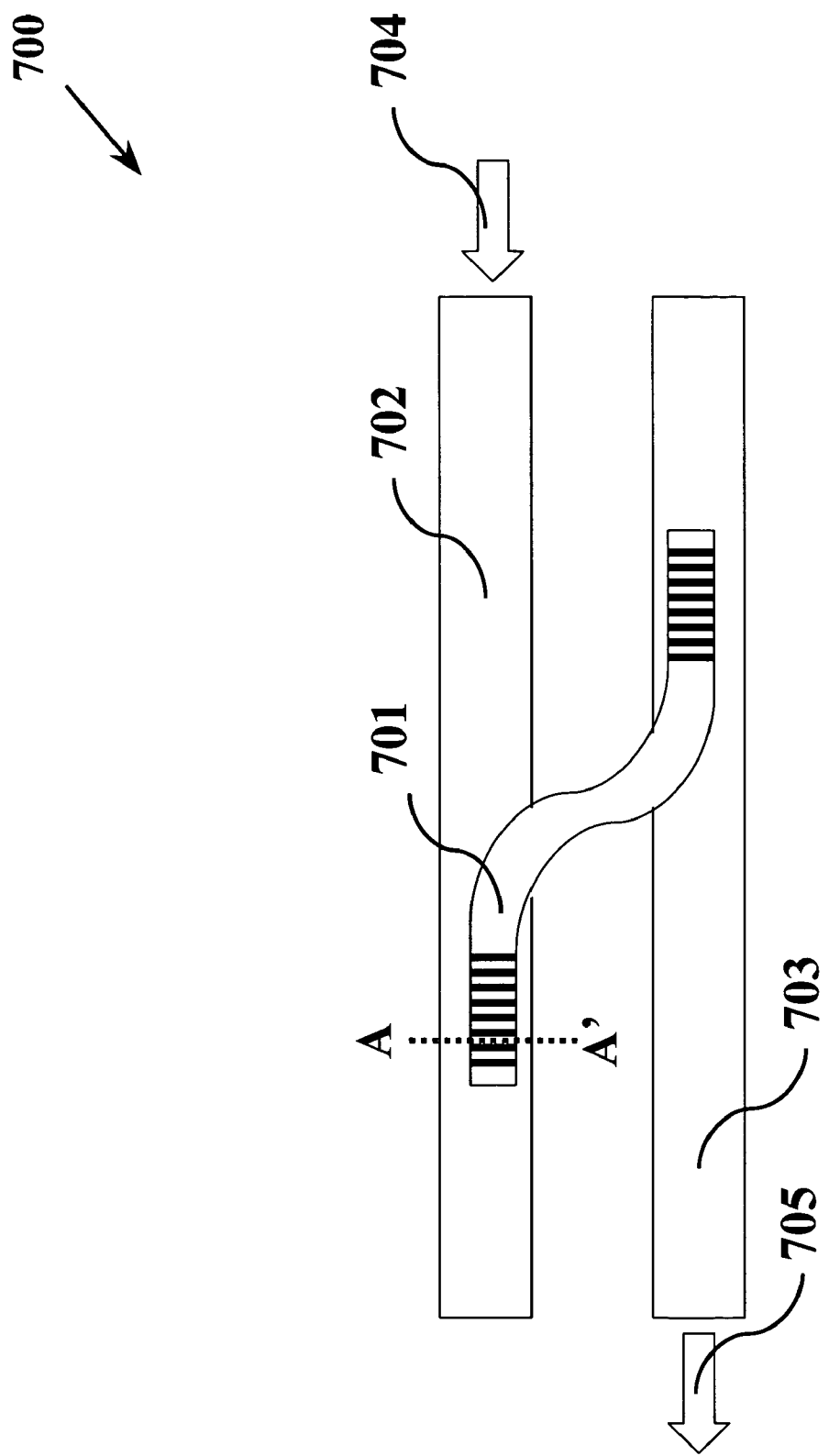
FIG. 7 is a schematic diagram for showing the design of a grating assisted directional coupler device based on vertically stacked waveguides.
Figure 8A:
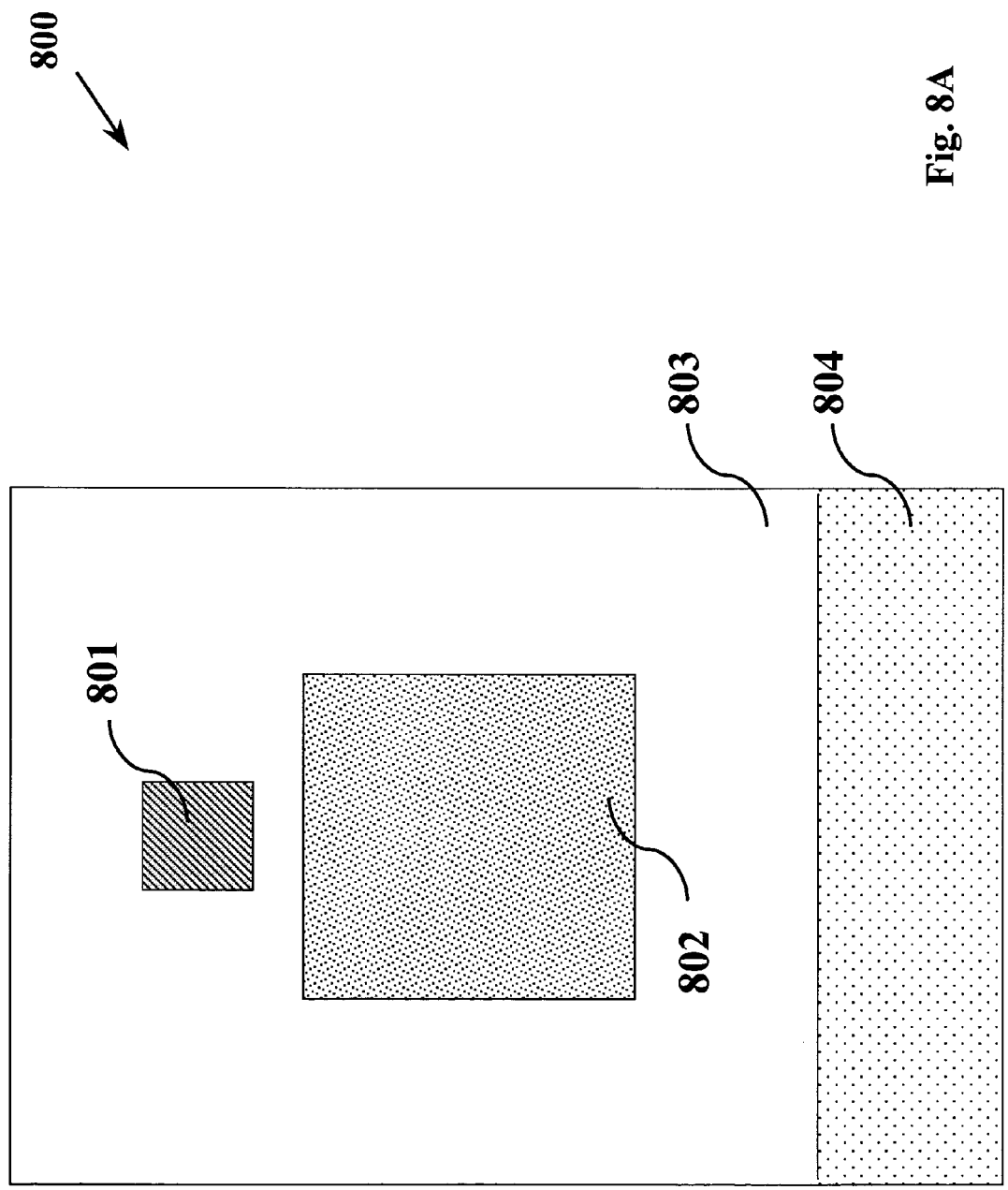
FIGS. 8A to 8B are schematic diagrams for showing the cross-section of the two different embodiments of the vertically stacked waveguides.
Figure 8B:
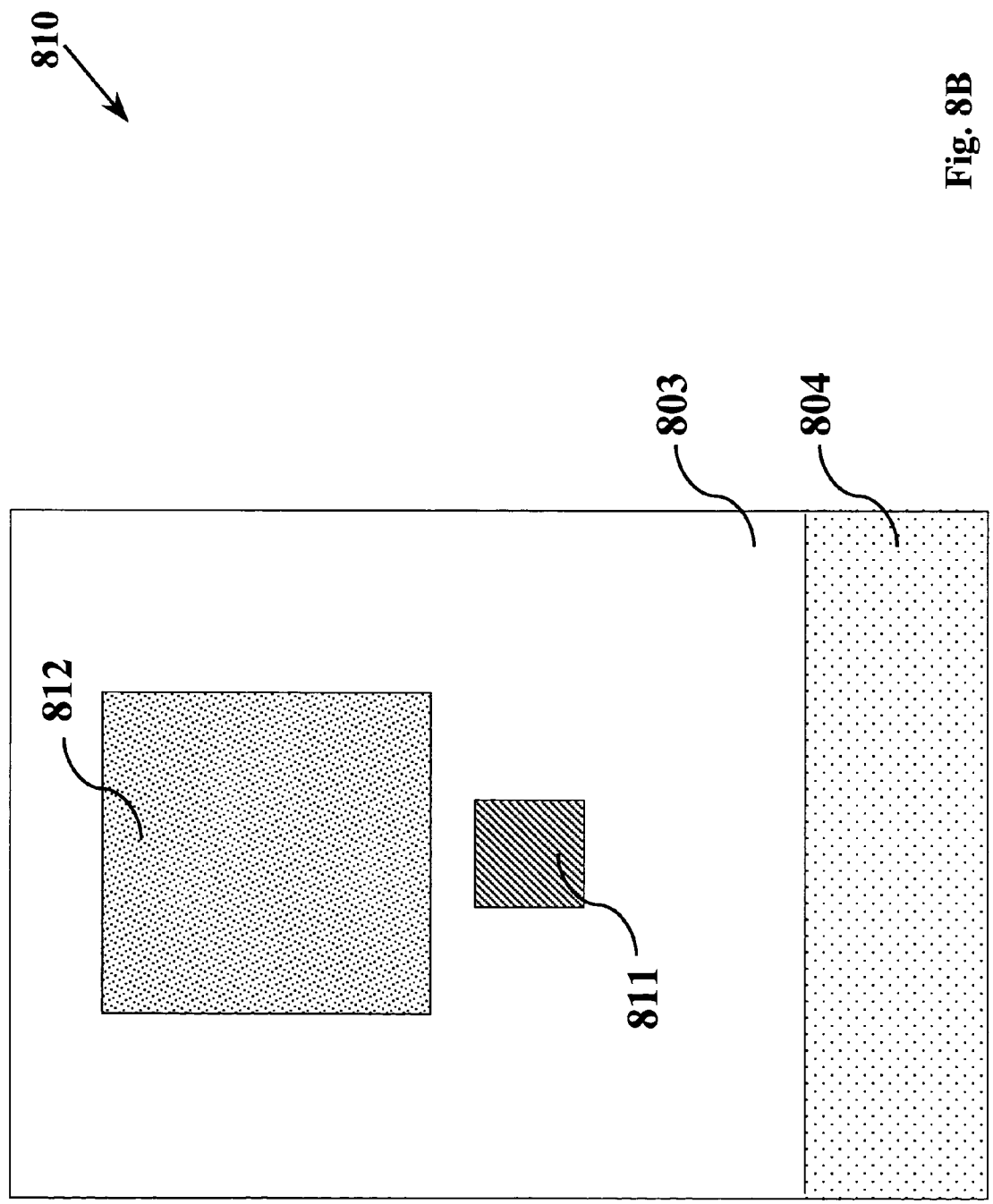

In FIG. 7, the input bus waveguide 702 and the output bus waveguide 703, and the bridge waveguide 701, each of which being a single-mode waveguide, are formed on two different planar levels, e.g., with the bridge waveguide either (a) above or (b) beneath both the input and the output bus waveguides. As an illustration, FIG. 8A shows the cross sectional view (along A–A' in FIG. 7) when the bridge waveguide is formed above the bus waveguides. Similarly, FIG. 8B shows the cross sectional view (along A–A' in FIG. 7) when the bridge waveguide is formed beneath the bus waveguides. (In both FIG. 8A to 8B the cladding is denoted by 803 and the substrate is denoted by 804.) With this new and improved configuration, the bridge waveguide 701 can be conveniently manufactured with different material having a different refraction index from the material as that employed for making input bus waveguide 702 and output bus waveguide 703.

Figure 9A:
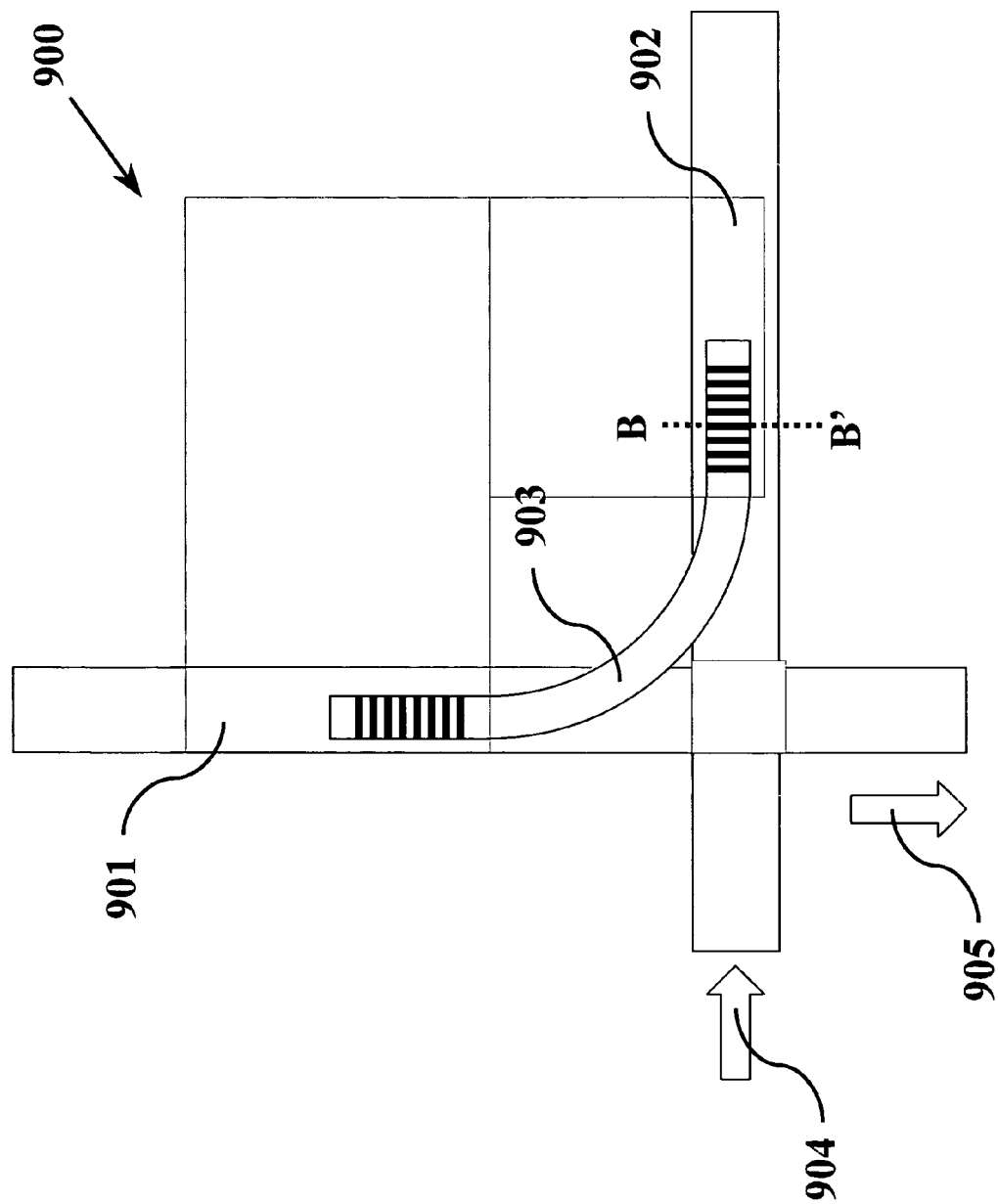
FIG. 9A to 9B are schematic diagrams for showing a design of a grating assisted directional coupler device based on vertically stacked waveguides where the input bus waveguide and the output bus waveguide crosses each other in a perpendicular fashion.

Referring to FIG. 9A, another configuration of an alternate vertically stacked waveguide structural is proposed. Similarly to FIG. 7, the bridge waveguide 903 is formed with different material and disposed on a different planar level from the intersecting input bus waveguide 902 and output bus waveguide 901. The bridge waveguide 903 can be formed either above or below the intersecting input bus waveguide 902 and output waveguide 901. As in the previous case, these are illustrated in FIG. 8A to 8B: FIG. 8A shows the cross sectional view (along B–B' in FIG. 9A) when the bridge waveguide is formed above the bus waveguides; FIG. 8B shows the cross sectional view (also along B–B' in FIG. 9A) when the bridge waveguide is formed beneath the bus waveguides.

Figure 9B:
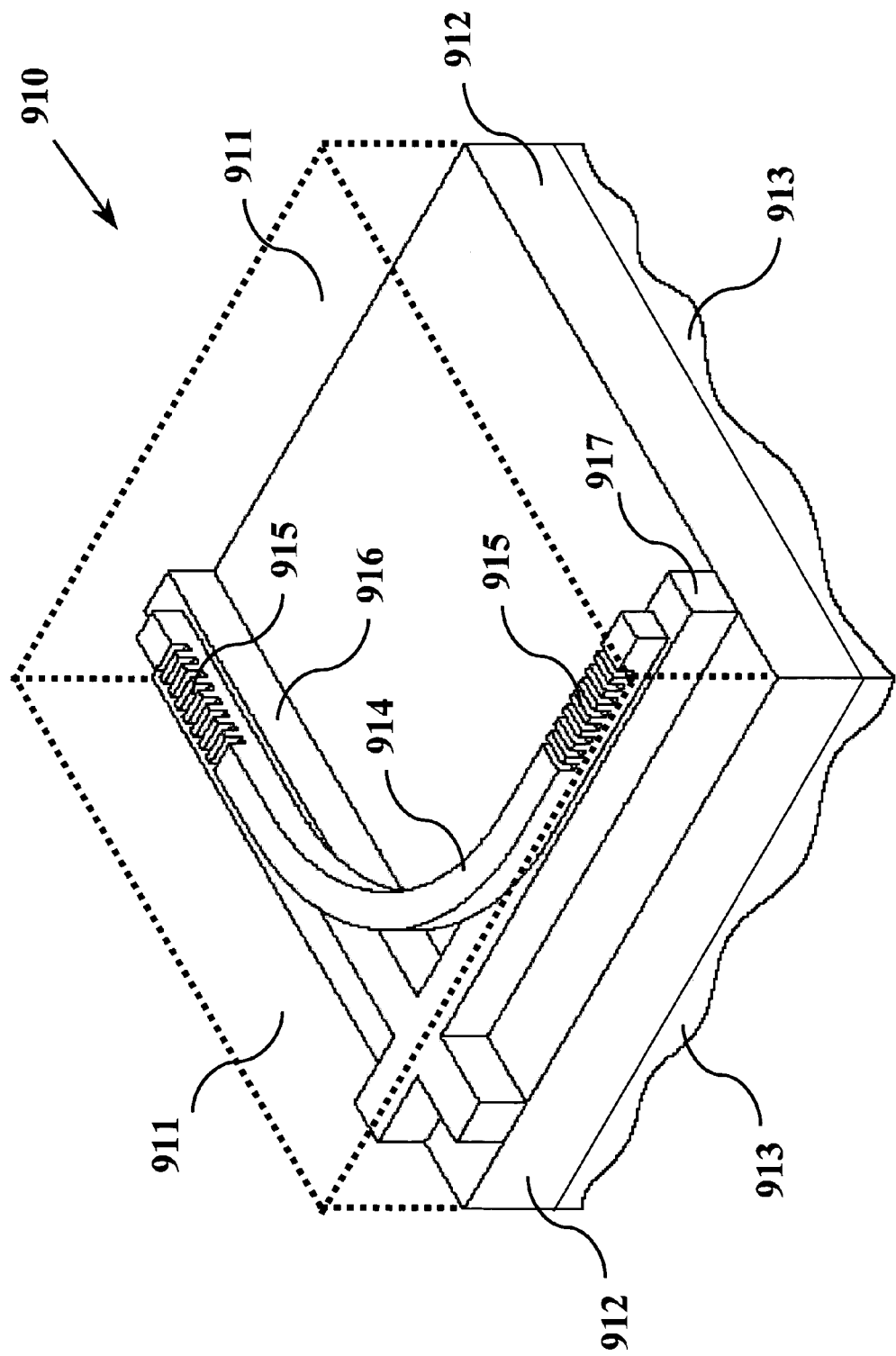

FIG. 9B is a perspective view of FIG. 9A. In particular, it is shown in this figure that the bridge waveguide 914 is formed with different material and is disposed on top of both the input and output bus waveguides 916 and 917. Moreover in this case, the gratings 915 are formed on the bridge waveguide 914.

The top cladding is denoted by 911, the bottom cladding is denoted by 912 and the substrate is denoted by 913, respectively, in FIG. 9B.

It should be mentioned that in the case when the Bragg grating is in the form of periodic geometrical variation of the propagating medium, it is preferred to have the grating structure be formed on top of the bridge waveguide. This way, undesirable reflection may be avoided.

The grating assisted directional coupler devices formed with the vertically stacked configurations as shown in FIGS. 9A to 9B have another advantage that the optical device can be manufactured with a more compact size and often with better and more manageable shape and form to more conveniently fit into different system configurations.

As mentioned earlier, both the bus and the bridge waveguides are to be fabricated using different material. In the above embodiments, choices of material suitable for each component are as follows.

(a) Cladding: (i) $SiO_2$ (silicon dioxide); (ii) doped $SiO_2$; and
 (iii) Polymer
(b) Bus core: (i) Doped $SiO_2$; (ii) $SiO_xN_y$ (silicon oxynitride);
 (iii) Polymer; and (iv) Aluminosilicate
(c) Bridge core: (i) SiRN; (ii) Si (silicon); (iii) $SiO_xN_y$;
 (iv) $Si_3N_4$ (silicon nitride); (v) mixture of $SiO_2$ and $Ta_2O_5$ (tantalum pentoxide); (vi) Polymer;
 (vii) PLZT (Lead Lanthanum Zirconate Titanate); and
 (viii) Aluminosilicate As a result there are at least 96 different combinations. They are tabulated in Table 3.

TABLE 3

| Cladding | Bus Core | Bridge Core |
|---|---|---|
| $SiO_2$ | Doped $SiO_2$ | SiRN |
| $SiO_2$ | Doped $SiO_2$ | Si |
| $SiO_2$ | Doped $SiO_2$ | $SiO_xN_y$ |
| $SiO_2$ | Doped $SiO_2$ | $Si_3N_4$ |
| $SiO_2$ | Doped $SiO_2$ | $Ta_2O_5$ & $SiO_2$ |
| $SiO_2$ | Doped $SiO_2$ | Polymer |
| $SiO_2$ | Doped $SiO_2$ | PLZT |
| $SiO_2$ | Doped $SiO_2$ | Aluminosilicate |
| $SiO_2$ | $SiO_xN_y$ | SiRN |
| $SiO_2$ | $SiO_xN_y$ | Si |
| $SiO_2$ | $SiO_xN_y$ | $SiO_xN_y$ |
| $SiO_2$ | $SiO_xN_y$ | $Si_3N_4$ |
| $SiO_2$ | $SiO_xN_y$ | $Ta_2O_5$ & $SiO_2$ |
| $SiO_2$ | $SiO_xN_y$ | Polymer |
| $SiO_2$ | $SiO_xN_y$ | PLZT |
| $SiO_2$ | $SiO_xN_y$ | Aluminosilicate |
| $SiO_2$ | Polymer | SiRN |
| $SiO_2$ | Polymer | Si |
| $SiO_2$ | Polymer | $SiO_xN_y$ |
| $SiO_2$ | Polymer | $Si_3N_4$ |
| $SiO_2$ | Polymer | $Ta_2O_5$ & $SiO_2$ |
| $SiO_2$ | Polymer | Polymer |
| $SiO_2$ | Polymer | PLZT |
| $SiO_2$ | Polymer | Aluminosilicate |
| $SiO_2$ | Aluminosilicate | SiRN |
| $SiO_2$ | Aluminosilicate | Si |
| $SiO_2$ | Aluminosilicate | $SiO_xN_y$ |
| $SiO_2$ | Aluminosilicate | $Si_3N_4$ |
| $SiO_2$ | Aluminosilicate | $Ta_2O_5$ & $SiO_2$ |
| $SiO_2$ | Aluminosilicate | Polymer |
| $SiO_2$ | Aluminosilicate | PLZT |
| $SiO_2$ | Aluminosilicate | Aluminosilicate |
| Doped $SiO_2$ | Doped $SiO_2$ | SiRN |
| Doped $SiO_2$ | Doped $SiO_2$ | Si |
| Doped $SiO_2$ | Doped $SiO_2$ | $SiO_xN_y$ |
| Doped $SiO_2$ | Doped $SiO_2$ | $Si_3N_4$ |
| Doped $SiO_2$ | Doped $SiO_2$ | $Ta_2O_5$ & $SiO_2$ |
| Doped $SiO_2$ | Doped $SiO_2$ | Polymer |
| Doped $SiO_2$ | Doped $SiO_2$ | PLZT |
| Doped $SiO_2$ | Doped $SiO_2$ | Aluminosilicate |
| Doped $SiO_2$ | $SiO_xN_y$ | SiRN |
| Doped $SiO_2$ | $SiO_xN_y$ | Si |
| Doped $SiO_2$ | $SiO_xN_y$ | $SiO_xN_y$ |
| Doped $SiO_2$ | $SiO_xN_y$ | $Si_3N_4$ |
| Doped $SiO_2$ | $SiO_xN_y$ | $Ta_2O_5$ & $SiO_2$ |
| Doped $SiO_2$ | $SiO_xN_y$ | Polymer |
| Doped $SiO_2$ | $SiO_xN_y$ | PLZT |
| Doped $SiO_2$ | $SiO_xN_y$ | Aluminosilicate |
| Doped $SiO_2$ | Polymer | SiRN |
| Doped $SiO_2$ | Polymer | Si |
| Doped $SiO_2$ | Polymer | $SiO_xN_y$ |
| Doped $SiO_2$ | Polymer | $Si_3N_4$ |
| Doped $SiO_2$ | Polymer | $Ta_2O_5$ & $SiO_2$ |
| Doped $SiO_2$ | Polymer | Polymer |
| Doped $SiO_2$ | Polymer | PLZT |
| Doped $SiO_2$ | Polymer | Aluminosilicate |
| Doped $SiO_2$ | Aluminosilicate | SiRN |
| Doped $SiO_2$ | Aluminosilicate | Si |
| Doped $SiO_2$ | Aluminosilicate | $SiO_xN_y$ |
| Doped $SiO_2$ | Aluminosilicate | $Si_3N_4$ |
| Doped $SiO_2$ | Aluminosilicate | $Ta_2O_5$ & $SiO_2$ |
| Doped $SiO_2$ | Aluminosilicate | Polymer |
| Doped $SiO_2$ | Aluminosilicate | PLZT |
| Doped $SiO_2$ | Aluminosilicate | Aluminosilicate |
| Polymer | Doped $SiO_2$ | SiRN |
| Polymer | Doped $SiO_2$ | Si |
| Polymer | Doped $SiO_2$ | $SiO_xN_y$ |
| Polymer | Doped $SiO_2$ | $Si_3N_4$ |
| Polymer | Doped $SiO_2$ | $Ta_2O_5$ & $SiO_2$ |
| Polymer | Doped $SiO_2$ | Polymer |
| Polymer | Doped $SiO_2$ | PLZT |
| Polymer | Doped $SiO_2$ | Aluminosilicate |
| Polymer | $SiO_xN_y$ | SiRN |
| Polymer | $SiO_xN_y$ | Si |
| Polymer | $SiO_xN_y$ | $SiO_xN_y$ |
| Polymer | $SiO_xN_y$ | $Si_3N_4$ |
| Polymer | $SiO_xN_y$ | $Ta_2O_5$ & $SiO_2$ |
| Polymer | $SiO_xN_y$ | Polymer |
| Polymer | $SiO_xN_y$ | PLZT |
| Polymer | $SiO_xN_y$ | Aluminosilicate |
| Polymer | Polymer | SiRN |
| Polymer | Polymer | Si |
| Polymer | Polymer | $SiO_xN_y$ |
| Polymer | Polymer | $Si_3N_4$ |
| Polymer | Polymer | $Ta_2O_5$ & $SiO_2$ |
| Polymer | Polymer | Polymer |
| Polymer | Polymer | PLZT |
| Polymer | Polymer | Aluminosilicate |
| Polymer | Aluminosilicate | SiRN |
| Polymer | Aluminosilicate | Si |
| Polymer | Aluminosilicate | $SiO_xN_y$ |
| Polymer | Aluminosilicate | $Si_3N_4$ |
| Polymer | Aluminosilicate | $Ta_2O_5$ & $SiO_2$ |
| Polymer | Aluminosilicate | Polymer |
| Polymer | Aluminosilicate | PLZT |
| Polymer | Aluminosilicate | Aluminosilicate |

In the case when both the cladding and the bus waveguide are made out of doped $SiO_2$ or polymer, it should be understood that the doping levels or the constituents are different so that the refractive indices of the cladding and the bus waveguide are different.

Finally, choices of material suitable for the substrate include Si and $SiO_2$.

It should be emphasized that even that the vertically stacked waveguide structure has been suggested elsewhere by other patented disclosures, the disclosures of the present invention is novel when these waveguides are made of different kinds of materials and that the gratings are formed on either or both of the waveguides, or in the cladding.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A wavelength-selective optical transmission system comprising:
    a first waveguide for transmitting a multiplexed optical signal therethrough;
    a second waveguide coupled to said first waveguide wherein a least one of said first and second waveguides having a set of wavelength-selective Bragg gratings disposed near a coupling section between said first and second waveguides to reflect a reflecting optical signal back to said first waveguide and for transmitting a contra-directional optical signal and a co-directional optical signal having respectively a contra-directional selected wavelength and a co-directional selected wavelength corresponding to said Bragg gratings wherein one of said contra-directional and co-directional wavelengths is chosen as a designated wavelength, and said reflecting optical signal and one of said contra-directional or co-directional optical signals are outside of a predefined range surrounding said designated wavelength; and
    said first and second waveguides are disposed and manufactured on a silicon substrate by applying an integrated circuit (IC) manufacturing process thereon; and
    said contra-directional wavelength is chosen as said designated wavelength and $$\beta_1 < \beta_2 \text{ and } \frac{\lambda_{min}}{\lambda_{max}} > \max\left(\frac{2\beta_1}{\beta_1 + \beta_2}, \frac{\beta_2 - \beta_1}{\beta_1 + \beta_2}\right).$$

2. The wavelength-selective optical transmission system of claim 1 wherein:
    said first waveguide and said second waveguide have two different propagation constants.

3. The wavelength-selective optical transmission system of claim 1 wherein:
    said first waveguide and said second waveguide composing of two different materials.

4. The wavelength-selective optical transmission system of claim 1 wherein:
    said Bragg gratings disposed on said first waveguide.

5. The wavelength-selective optical transmission system of claim 1 wherein:
    said Bragg gratings comprising a periodic variation of a refractive index of an optical propagation material.

6. The wavelength-selective optical transmission system of claim 1 wherein:
    said Bragg gratings comprising a periodic variation of a structural characteristic of an optical propagation material.

7. The wavelength-selective optical transmission system of claim 1 wherein:
    said Bragg gratings comprising a periodic variation of a structural characteristic and a refractive index of an optical propagation material.

8. The wavelength-selective optical transmission system of claim 1 wherein:
    said first and second waveguides are manufactured on a silicon substrate by applying an integrated circuit (IC) manufacturing process thereon.

9. The wavelength-selective optical transmission system of claim 1 wherein:
    said predefined range of wavelength surrounding said designated selected wavelength having a wavelength range between $\lambda_{min}$ and $\lambda_{max}$ and said first and second waveguide having an optical propagation constant of $\beta_1$ and $\beta_2$ respectively.

10. The wavelength-selective optical transmission system of claim 1 wherein:
    said first waveguide having a $SiO_2$ cladding and a doped $SiO_2$ core and said second waveguide have a $SiO_2$ cladding and a SiRN core.

11. The wavelength-selective optical transmission system of claim 1 wherein:
    said first waveguide having a $SiO_2$ cladding and a doped $SiO_2$ core and said second waveguide have a $SiO_2$ cladding and a Si core.

12. The wavelength-selective optical transmission system of claim 1 wherein:
    said first waveguide having a $SiO_2$ cladding and a doped $SiO_2$ core and said second waveguide have a $SiO_2$ cladding and a $SiO_xN_y$ core.

13. The wavelength-selective optical transmission system of claim 1 wherein:
    said first waveguide having a $SiO_2$ cladding and a doped $SiO_2$ core and said second waveguide have a $SiO_2$ cladding and a $Si_3N_4$ core.

14. The wavelength-selective optical transmission system of claim 1 wherein:
    said first waveguide having a $SiO_2$ cladding and a doped $SiO_2$ core and said second waveguide have a $SiO_2$ cladding and a $Ta_2O_5$ & $SiO_2$ core.

15. The wavelength-selective optical transmission system of claim 1 wherein:
    said first waveguide having a $SiO_2$ cladding and a doped $SiO_2$ core and said second waveguide have a $SiO_2$ cladding and a polymer core.

16. The wavelength-selective optical transmission system of claim 1 wherein:
    said first waveguide having a $SiO_2$ cladding and a doped $SiO_2$ core and said second waveguide have a $SiO_2$ cladding and a PLZT core.

17. The wavelength-selective optical transmission system of claim 1 wherein:
    said first waveguide having a $SiO_2$ cladding and a doped $SiO_2$ core and said second waveguide have a $SiO_2$ cladding and an aluminosilicate core.

* * * * *